United States Patent
Lee et al.

(10) Patent No.: US 12,088,513 B2
(45) Date of Patent: Sep. 10, 2024

(54) METHOD AND APPARATUS FOR RETRANSMITTING PACKETS IN DUAL CONNECTIVITY NETWORK

(71) Applicant: Samsung Electronics Co., Ltd., Suwon-si (KR)

(72) Inventors: Taeseop Lee, Suwon-si (KR); Taejeoung Kim, Suwon-si (KR); Minsuk Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 341 days.

(21) Appl. No.: 17/417,648

(22) PCT Filed: Dec. 17, 2020

(86) PCT No.: PCT/KR2020/018571
§ 371 (c)(1),
(2) Date: Jun. 23, 2021

(87) PCT Pub. No.: WO2021/251573
PCT Pub. Date: Dec. 16, 2021

(65) Prior Publication Data
US 2022/0337346 A1 Oct. 20, 2022

(30) Foreign Application Priority Data
Jun. 9, 2020 (KR) .................. 10-2020-0069851

(51) Int. Cl.
*H04W 28/04* (2009.01)
*H04L 1/1812* (2023.01)
(Continued)

(52) U.S. Cl.
CPC .......... *H04L 5/0001* (2013.01); *H04L 1/1812* (2013.01); *H04L 1/1851* (2013.01);
(Continued)

(58) Field of Classification Search
None
See application file for complete search history.

(56) References Cited

U.S. PATENT DOCUMENTS 10,004,098 B2 * 6/2018 Kim .................. H04L 1/189
10,448,386 B2 10/2019 Hong et al.
(Continued)

FOREIGN PATENT DOCUMENTS

CN 109041122 12/2018
CN 110691419 1/2020
(Continued)

OTHER PUBLICATIONS

"3rd Generation Partnership Project; Technical Specification Group Radio Access Network; NR; Packet Data Convergence Protocol (PDCP) specification", (Release 16), 3GPP TS 38.323, V16.0.0, Mar. 2020, 37 pages.
(Continued)

*Primary Examiner* — Kodzovi Acolatse
(74) *Attorney, Agent, or Firm* — Nixon & Vanderhye, P.C.

(57) ABSTRACT

Provided is a data transmission method including obtaining, from a core network (CN), at least one packet to be transmitted to a user equipment via a first cell group or a second cell group, determining a packet to be transmitted via the second cell group, among the at least one packet, transmitting the determined packet to the user equipment via the second cell group, obtaining packet delivery state information of the first cell group and packet delivery state information of the second cell group, determining whether to retransmit the transmitted packet based on the packet delivery state information of the first cell group and the packet delivery state information of the second cell group,
(Continued)

and retransmitting the packet determined to be retransmitted to the user equipment via the first cell group.

20 Claims, 22 Drawing Sheets

(51) Int. Cl.
 *H04L 1/1829* (2023.01)
 *H04L 1/1867* (2023.01)
 *H04L 5/00* (2006.01)
(52) U.S. Cl.
 CPC ............ *H04L 1/1887* (2013.01); *H04L 1/189* (2013.01); *H04W 28/04* (2013.01)

(56) References Cited

U.S. PATENT DOCUMENTS

| | | | | |
|---|---|---|---|---|
| 10,779,356 | B2* | 9/2020 | Kim | ............... H04B 7/2612 |
| 11,019,532 | B2 | 5/2021 | Kim | |
| 11,246,178 | B2 | 2/2022 | Shikari et al. | |
| 11,291,066 | B2 | 3/2022 | Takeda et al. | |
| 2017/0171905 | A1* | 6/2017 | Uchino | ............... H04W 72/04 |
| 2017/0311200 | A1* | 10/2017 | Koskinen | ............... H04W 16/32 |
| 2019/0097874 | A1* | 3/2019 | Zhou | ............... H04L 5/0023 |
| 2019/0149305 | A1* | 5/2019 | Zhou | ............... H04L 5/0023 370/330 |
| 2019/0150217 | A1* | 5/2019 | Kim | ............... H04L 1/1809 370/329 |
| 2019/0229864 | A1 | 7/2019 | Kim et al. | |
| 2019/0268801 | A1* | 8/2019 | Wang | ............... H04W 76/16 |
| 2019/0327607 | A1* | 10/2019 | Xiao | ............... H04L 5/0053 |
| 2019/0349822 | A1* | 11/2019 | Kim | ............... H04W 76/10 |
| 2019/0357137 | A1* | 11/2019 | Shah | ............... H04W 80/02 |
| 2020/0313808 | A1* | 10/2020 | Lee | ............... H04L 1/1812 |
| 2020/0314714 | A1* | 10/2020 | Jung | ............... H04W 76/27 |
| 2020/0389263 | A1* | 12/2020 | Toeda | ............... H04W 76/19 |
| 2021/0099977 | A1* | 4/2021 | Dalmiya | ............ H04W 28/0864 |
| 2021/0153262 | A1* | 5/2021 | Mochizuki | ............. H04W 56/0045 |
| 2021/0153279 | A1* | 5/2021 | Takeda | ............... H04W 52/242 |
| 2021/0314270 | A1* | 10/2021 | Dalmiya | ............... H04L 41/16 |
| 2021/0345454 | A1* | 11/2021 | Dhanapal | ............ H04W 28/0268 |
| 2021/0352521 | A1* | 11/2021 | Pan | ............... H04L 47/24 |
| 2021/0368500 | A1* | 11/2021 | Centonza | ............. H04W 72/541 |
| 2021/0377804 | A1* | 12/2021 | Sivaraj | ............... H04W 76/15 |
| 2021/0385031 | A1* | 12/2021 | Liu | ............... H04L 1/1835 |

FOREIGN PATENT DOCUMENTS

| | | | |
|---|---|---|---|
| CN | 111345009 | 6/2020 | |
| KR | 10-2014-0131245 | 11/2014 | |
| KR | 10-2015-0018248 | 2/2015 | |
| KR | 10-2018-0134731 | 12/2018 | |
| WO | WO-2018127225 A1 * | 7/2018 | ............... H04L 1/00 |
| WO | 2018/229878 | 12/2018 | |
| WO | 2019/064202 | 4/2019 | |
| WO | 2019/097705 | 5/2019 | |
| WO | 2019/135647 | 7/2019 | |
| WO | 2019/152849 | 8/2019 | |
| WO | WO-2020166037 A1 * | 8/2020 | |

OTHER PUBLICATIONS

Samsung, "Centralized retransmission for multi-connectivity case", R3-173851, 3GPP TSG-RAN WG3 Meeting, #97bis, Prague, Czech, Sep. 30, 2017, 6 pages.
Intel Corp., "Correction for the handover issues in a separated CP/UP Deployment", (TP for NR BL CR for TS 38.425), R3-185071, 3GPP TSG-RAN WG3 Meeting #101, Gothenburg, Sweden, Aug. 10, 2018, 9 pages.
"GTI 5G Network Architecture White Paper", Version 1.0, last edit date Feb. 12, 2018, 26 pages.
Son, "How to reduce 5G RAN/Fronthaul deployment cost?: [Answer] Function Split and Open Fronthaul Interface", NETMANIAS, Jan. 18, 2018, 2 pages.
Doh, "LTE to 5G Mitigation: Part 2. Data Transmission Paths in NSA 5G", NETMANIAS, Jul. 31, 2019, 4 pages.
Son et al., "What is KT's 5G network structure?—Analysis of KT's 5G network structure", NETMANIAS, Oct. 28, 2015, 2 pages.
International Search Report and Written Opinion of the ISA for PCT/KR2020/018571 dated Mar. 25, 2021, 18 pages with English Translation.
Extended Search Report dated Sep. 29, 2023 in counterpart European Application No. 20940411.0.
Huawei: (TP for CPUP_Split BL CR for TS 38.401): on centralized retransmission for CP-UP separation; R3-183290, 3GPP TSG-RAN3 Meeting #100, Busan, Korea, May 21-25, 2018, 5 pages.
NTT Docomo Inc.: Discussion on HARQ retransmission and control signaling for LAA DL; R1-151959, 3GPP TSG RAN WG1 Meeting #80bis, Belgrade, Serbia, Apr. 20-24, 2015, 4 pages.
Office Action dated Jun. 28, 2024 in Chinese Patent Application No. 202080101937.1 and English-language translation.

* cited by examiner

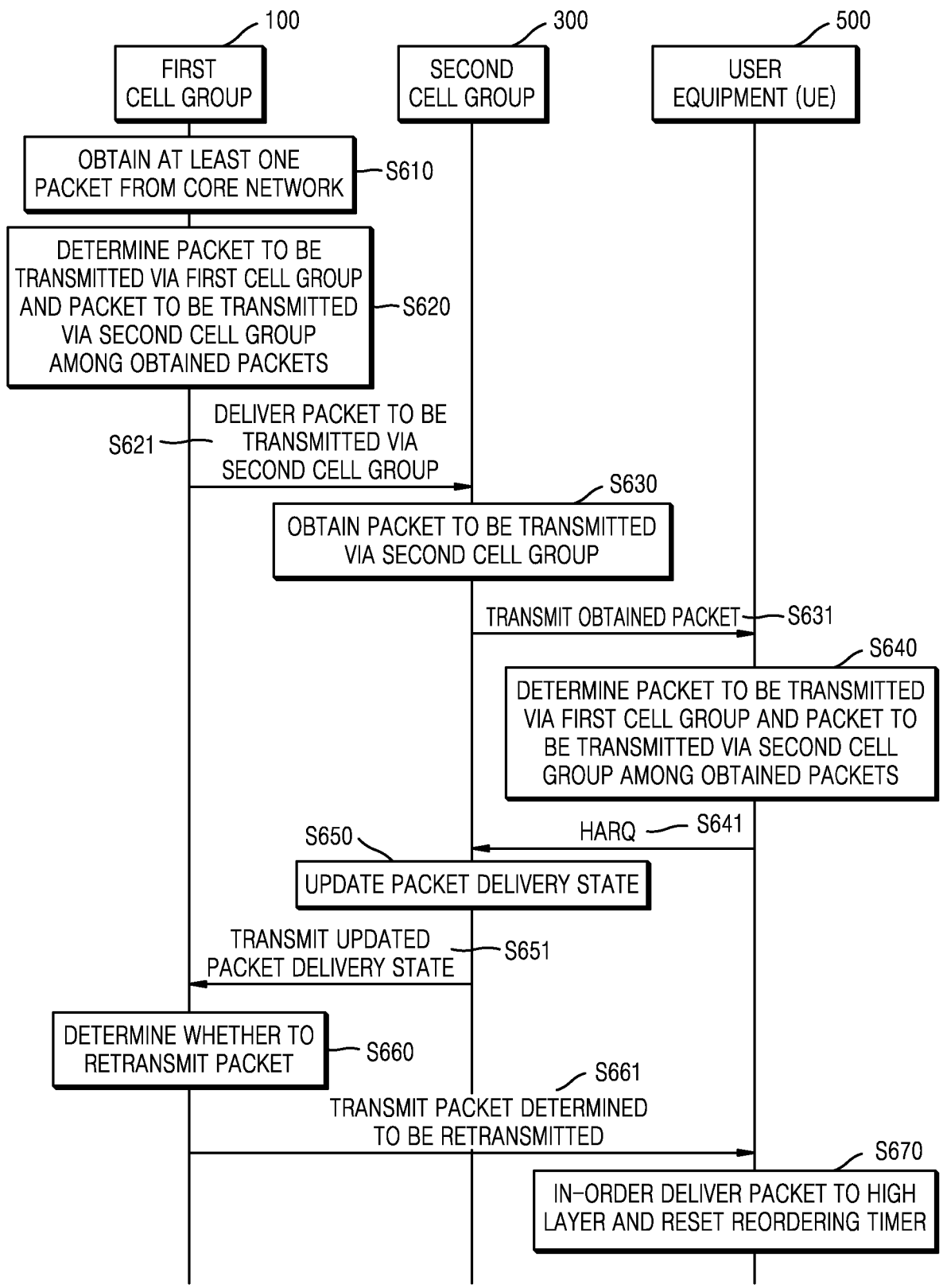

METHOD AND APPARATUS FOR RETRANSMITTING PACKETS IN DUAL CONNECTIVITY NETWORK

This application is the U.S. national phase of International Application No. PCT/KR2020/018571 filed Dec. 17, 2020 which designated the U.S. and claims priority to KR Patent Application No. 10-2020-0069851 filed Jun. 9, 2020, the entire contents of each of which are hereby incorporated by reference.

BACKGROUND

Field

The disclosure relates to a data transmission method and apparatus using a split bearer, and more particularly, to a method and apparatus for retransmitting a packet having a transmission delay by using a split bearer when the transmission delay occurs.

Description of Related Art

Dual connectivity refers to a standardized technology in a Long Term Evolution (LTE) system which is $4^{th}$-Generation (4G) communication for small-cell performance improvement, in which a split bearer is used to transmit data to two or more cell groups.

A user equipment performs reordering to in-order process a received packet in a transmission order, and when a certain packet is not received, the user equipment sets a reordering timer and waits for reception of the packet. In this case, when the packet is not received until expiration of the reordering timer for some reason, massive data loss and transmission rate reduction may subsequently occur.

SUMMARY

According to an embodiment of the disclosure, there is provided a system and method in which, in a dual connectivity network environment, a packet delay is prevented from being caused by a reordering delay occurring when a user equipment in-order delivers a packet to a high layer, and a loss caused by expiration of a reordering timer is prevented.

A representative feature of the disclosure for solving the foregoing problem is as below.

According to an embodiment of the disclosure, there is provided a data transmission method including obtaining, from a core network (CN), at least one packet to be transmitted to a user equipment via a first cell group or a second cell group, determining a packet to be transmitted via the second cell group, among the at least one packet, transmitting the determined packet to the user equipment via the second cell group, obtaining packet delivery state information of the first cell group and packet delivery state information of the second cell group, determining whether to retransmit the transmitted packet based on the packet delivery state information of the first cell group and the packet delivery state information of the second cell group, and retransmitting the packet determined to be retransmitted to the user equipment via the first cell group.

According to another embodiment of the disclosure, the determining of the retransmission may include predicting expiration of a reordering timer of the user equipment and determining to retransmit the transmitted packet when the expiration of the reordering timer is expected.

According to another embodiment of the disclosure, the predicting of the expiration of the reordering timer may include comparing $T_{reordertimer} - (T_{real} - T_{reorder})$ with a certain threshold value, and $T_{reordertimer}$ may indicate a time for which the user equipment waits for the transmitted packet, $T_{real}$ may indicate a current time, and $T_{reorder}$ may indicate a time from which the reordering timer starts in the user equipment.

According to another embodiment of the disclosure, the determining of the retransmission may include inputting current packet delivery state information of the first cell group and current packet delivery state information of the second cell group to an artificial intelligence (AI) model trained based on the packet delivery state information of the first cell group and the packet delivery state information of the second cell group.

According to another embodiment of the disclosure, the packet delivery state information of the first cell group and the packet delivery state information of the second cell group may be determined based on feedback information received from the user equipment.

According to another embodiment of the disclosure, the packet delivery state information of the first cell group may include a downlink data delivery status (DDDS) of a radio link control (RLC) layer of the first cell group, and the packet delivery state information of the second cell group may include a DDDS of an RLC layer of the second cell group.

According to another embodiment of the disclosure, the retransmitting of the determined packet may include transmitting the packet determined to be retransmitted, preferentially over other packets.

According to an embodiment of the disclosure, there is provided a data transmission apparatus including a communicator, a memory storing a plurality of instructions, and at least one processor configured to execute the plurality of instructions, in which the at least one processor is further configured to obtain, from a core network (CN), at least one packet to be transmitted to a user equipment via a first cell group or a second cell group, determine a packet to be transmitted via the second cell group, among the at least one packet, transmit the determined packet to the user equipment via the second cell group, obtain packet delivery state information of the first cell group and packet delivery state information of the second cell group, and determine whether to retransmit the transmitted packet based on the packet delivery state information and the packet delivery state information, and the communicator is configured to transmit the determined packet to the user equipment via the second cell group and retransmit the packet determined to be retransmitted to the user equipment via the first cell group.

According to an embodiment of the disclosure, there is provided a computer-readable recording medium having recorded thereon a program for executing the data transmission method.

Furthermore, other methods for implementing the disclosure, other systems, and a computer-readable recording medium having recorded thereon a computer program for executing the data transmission method may be further provided.

According to the disclosure, in a dual connectivity network environment, expiration of a reordering timer of a user equipment may be predicted to avoid a resulting loss, thereby preventing massive data loss and a sharp decrease in a transmission rate.

BRIEF DESCRIPTION OF THE DRAWINGS

FIG. 6 is an operating flowchart of a wireless communication system, according to an embodiment of the disclosure;

DETAILED DESCRIPTION

Figure 1:
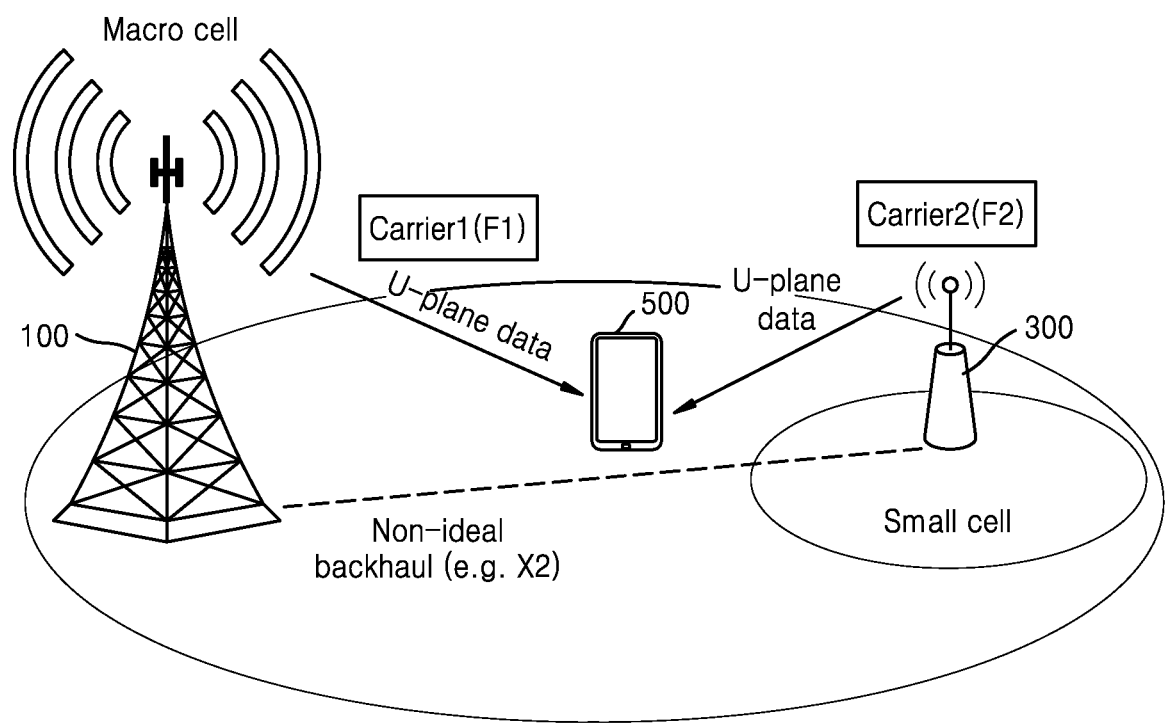
FIG. 1 illustrates a dual connectivity wireless communication system.

A data transmission method according to an embodiment of the disclosure includes obtaining, from a core network (CN), at least one packet to be transmitted to a user equipment via a first cell group or a second cell group, determining a packet to be transmitted via the second cell group, among the at least one packet, transmitting the determined packet to the user equipment via the second cell group, obtaining packet delivery state information of the first cell group and packet delivery state information of the second cell group, determining whether to retransmit the transmitted packet based on the packet delivery state information and the packet delivery state information, and retransmitting the packet determined to be retransmitted to the user equipment via the first cell group.

Hereinafter, various embodiments of the present disclosure will be disclosed with reference to the accompanying drawings.

When the embodiments of the disclosure are described, technical matters that are well known in a technical field of the disclosure and are not directly related to the disclosure will not be described. By omitting any unnecessary description, the subject matter of the disclosure will be more clearly described without being obscured.

For the same reasons, some elements will be exaggerated, omitted, or simplified in the attached drawings. The size of each element does not entirely reflect the actual size of the element. In each drawing, an identical or corresponding element will be referred to as an identical reference numeral.

Advantages and features of the disclosure and a method for achieving them will be apparent with reference to embodiments of the disclosure described below together with the attached drawings. However, the disclosure is not limited to the disclosed embodiments, but may be implemented in various manners, and the embodiments are provided to complete the disclosure of the disclosure and to allow those of ordinary skill in the art to understand the scope of the disclosure, and the disclosure is defined by the category of the claims. Throughout the specification, an identical reference numeral will indicate an identical element.

Meanwhile, it is known to those of ordinary skill in the art that blocks of a flowchart and a combination of flowcharts may be represented and executed by computer program instructions. These computer program instructions may also be stored in a general-purpose computer, a special-purpose computer, or a processor of other programmable data processing devices, such that the instructions implemented by the computer or the processor of the programmable data processing device produce a means for performing functions specified in the flowchart and/or block diagram block(s). These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block(s). The computer program instructions may also be loaded onto a computer or other programmable data processing apparatus to cause a series of operational steps to be performed on the computer or other programmable apparatus to produce a computer implemented process, such that the instructions that execute the computer or other programmable apparatus may provide steps for implementing the functions specified in the flowchart and/or block diagram block(s).

In addition, each block represents a module, segment, or portion of code, which includes one or more executable instructions for implementing the specified logical function (s). It should also be noted that in other implementations, the function(s) noted in the blocks may occur out of the order indicated. For example, two blocks shown in succession may, in fact, be executed substantially concurrently or the blocks may sometimes be executed in the reverse order, depending on the functionality involved.

In the current embodiment, the term '~unit', as used herein, denotes a software or hardware component, such as a field programmable gate array (FPGA) or application specific integrated circuit (ASIC), which performs certain tasks. However, the meaning of '~unit' is not limited to software or hardware. '~unit' may advantageously be configured to reside on the addressable storage medium and configured to reproduce one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and '~unit(s)' may be combined into fewer components and '~unit(s)' or further separated into additional components and '~unit(s)'. In addition, components and '~unit(s)' may be implemented to execute one or more CPUs in a device or a secure multimedia card. In the embodiments of the disclosure, '~unit' may include one or more processors.

A function related to artificial intelligence (AI) according to the disclosure is performed through a processor and a memory. The processor may include one processor or a plurality of processors. In this case, one processor or a plurality of processors may include a general-purpose processor such as a CPU, an application processor (AP), a digital signal processor (DSP), etc., a graphic-dedicated processor such as a GPU, a vision processing unit (VPU), etc., or an AI-dedicated processor such as a neural processing unit (NPU). One processor or a plurality of processors may control data to be processed according to a predefined operation rule or AI model stored in the memory. When one processor includes or a plurality of processors include an AI-dedicated processor, the AI-dedicated processor may be designed as a hardware structure specialized for processing a specific AI model.

The predefined operation rule or AI model may be made through training. Herein, when the predefined operation rule or AI model is made through training, it may mean that a basic AI model is trained based on a learning algorithm by using multiple pieces of training data, such that the predefined operation rule or AI model set to execute sought characteristics (or purpose) is made. Such training may be performed by a device on which AI according to the disclosure is implemented, or by a separate server and/or system. Examples of the learning algorithm may include, but not limited to, supervised learning, unsupervised learning, semi-supervised learning, or reinforcement learning.

The AI model may include a plurality of neural network layers. Each of the plurality of neural network layers may have a plurality of weight values, and perform a neural network operation through an operation between an operation result of a previous layer and the plurality of weight values. The plurality of weight values of the plurality of neural network layers may be optimized by a training result of the AI model. For example, the plurality of weight values may be updated to reduce or minimize a loss value or a cost value obtained in the AI model during a training process. Examples of an artificial neural network may include, but not limited to, a convolutional neural network (CNN), a deep neural network (DNN), a recurrent neural network (RNN), a restricted Boltzmann machine (RBM), a deep belief network (DBN), a bidirectional recurrent deep neural network (BRDNN), or a deep Q-network.

Hereinafter, the disclosure will be described in detail with reference to the accompanying drawings.

Prior to a description of the specification, a $4^{th}$-Generation (4G) Long Term Evolution (LTE) system, a 5th-Generation (5G) New Radio (NR) system, and dual connectivity (DC) will be described.

A base station, which is an entity communicating with a user equipment, may be denoted as a BS, a node, a NodeB, a Node, a NodeB (NB), an eNodeB (eNB), a gNodeB (gNB), an access point (AP), or the like.

A user equipment, which is an entity communicating with a base station, may be referred to as a UE, a user terminal, a mobile station (MS), a mobile equipment (ME), a device, a terminal, or the like.

Broadband wireless technologies have evolved to satisfy more and more broadband subscribers and to provide better applications and services.

4G wireless communication systems have been developed to provide a high-speed data service, but now, they are suffering from the shortage of resources for meeting the growing demands for high-speed data services.

In this regard, 5G wireless communication systems have been developed to satisfy the growing demands for the high-speed data services and to support ultra-reliability and low-latency applications.

The 5G wireless communication systems may be implemented in higher-frequency (mm Wave) bands, e.g., 10 GHz through 100 GHz bands, as well as in lower-frequency bands, to obtain higher data rates.

To reduce a propagation loss of electric waves and increase a transmission distance, beamforming, multi-input multi-output (MIMO), full dimension MIMO, an array antenna, and beamforming schemes have been considered in the designing of the 5G wireless communication systems.

Herein, for convenience of a description, the 4G wireless communication systems will be mainly described, but unless specially mentioned, a corresponding technology may also be applied to the 5G wireless communication systems.

The user equipment may communicate with an eNB in the 4G wireless communication system, and the user equipment may communicate with a gNB in the 5G wireless communication system.

In the 4G wireless communication system, a wireless protocol stack for communication between a user equipment and an eNB may include packet data convergence protocol (PDCP), radio link control (RLC), media access control (MAC), and physical (PHY) sub-layers, in which one or more data radio bearers (DRBs) may be established between the user equipment and the eNB to exchange user-plane packets.

Each data radio bearer may be associated with one PDCP entity and one or more RLC entities, and each data radio bearer may be associated with a logic channel of a MAC sub-layer. In the user equipment, there is one MAC entity for the eNB.

Main services and functions of the MAC sub-layer may include mapping between logic channels and transmission channels, multiplexing/demultiplexing of MAC service data units (SDUs) belonging to one logic channel or different logic channels to/from transport blocks (TBs) delivered to/from a physical channel on the transmission channels, scheduling information report, error correction based on a hybrid automatic repeat request (HARQ), priority processing between logic channels of one user equipment, priority processing between user equipments based on dynamic scheduling, and transmission format selection and padding.

Main services and functions of a PDCP sub-layer regarding a user plane may include header compression and decompression: robust header compression (ROHC) only, transmission of user data, in-order delivery of high-layer PDUs in a PDCP re-establishment procedure for a radio link control acknowledged mode (RLC AM), in the case of split bearers in DC (only RLC AM supported): PDCP PDU routing for transmission and PDCP PDU reordering for reception, redundant detection of low-layer SDUs in the PDCP re-establishment procedure for RLC AM, retransmission of PDCP PDUs in a PDCP data recovery procedure in the case of PDCP SDUs in handover and split bearers of DC, encryption and decryption, and timer-based discarding of SDUs in an uplink (UL).

The functions of the PDCP sub-layer may be performed by PDCP entities. Each PDCP entity may carry data of one radio bearer.

Due to mobility of a user equipment, the user equipment may hand over from one eNB to another eNB.

In a dual connectivity operation mode due to mobility of the user equipment, the user equipment may hand over from one master eNB (MeNB) to another MeNB or perform secondary cell group (SCG) change from one secondary eNB (SeNB) to another SeNB.

The eNB may support multiple cells, and the user equipment may hand over from one cell of the same eNB to another cell of the same eNB.

FIG. 1 illustrates a dual connectivity wireless communication system.

Dual connectivity, which is a standardized technology in the LTE system, a 4G communication system, for small-cell performance improvement, aims to improve the throughput of the user equipment by using radio resources in multiple carriers, similarly to carrier aggregation (CA).

According to the 4G communication standards, the $3^{rd}$ Generation Partnership Project (3GPP) 36.300, DC is an operation mode where a user equipment capable of performing multi-transmission/reception in a radio resource control (RRC) connection mode is configured to use a radio resource of each scheduler located in two eNBs (the master eNB and the secondary eNB), and the two eNBs are connected via an X2 interface in a non-ideal backhaul.

For one user equipment, eNBs may perform different functions which do not depend on power classes of the eNBs. The role of the eNB may differ from user equipment to user equipment. For example, even though a first eNB functions as a master eNB and a second eNB functions as a secondary eNB for a first user equipment, the second eNB may function as the master eNB and the first eNB may function as the secondary eNB for a second user equipment. Dual connectivity is used as a basic concept for deployment of a multiple radio access technology (RAT) mobile network in 5G communication. Multi-RAT dual connectivity (MR-DC) is a general term indicating various dual connectivity configurations related to 5G communication. A master radio access network (RAN) node (or a master NodeB) may operate as a control entity by using a secondary RAN node (or a secondary NodeB) to obtain an additional data capacity through MR-DC.

An eNB of LTE and a gNB of NR may be collectively referred to as NBs, i.e., nodes (or NodeB).

A cell group, which is a set of serving cells controlled by the same base station, may include a master cell group (MCG) and a secondary cell group (SCG), and each cell group may include one cell. A cell constituting a cell group may be any one of an eNodeB of LTE or a gNodeB of NR.

The master cell group may mean a group of serving cells related to a master node including a primary cell (PCell) and optionally, one or more secondary cells (SCells), and the secondary cell group may mean a group of serving cells related to a secondary node including a PCell and optionally, one or more SCells.

The PCell and the SCell are terms indicating the types of serving cells configured for the user equipment. There are several differences between the PCell and the SCell in which for example, the PCell may maintain an active state at all times, but the SCell may be in the active state or an inactive state according to an instruction of the base station. The mobility of the user equipment may be controlled based on the PCell, and the SCell may be understood as an additional serving cell for data transmission and reception. The PCell and the SCell of the disclosure may mean the PCell and the SCell defined in the LTE standards, the 5G standards, and so forth.

Referring to FIG. 1, a wireless communication system that provides dual connectivity according to an embodiment of the disclosure may include a first NodeB 100 constituting a macro cell, a second NodeB 300 constituting a small cell, and a user equipment 500.

The macro cell, controlled by a macro base station, may provide a service in a relatively large area. On the other hand, the small cell may provide a service in an area that is much smaller than a general macro cell. Although there is no strict criterion for distinguishing the macro cell from the small cell, the area of the macro cell may generally have a radius of about 500 m and the area of the small cell may generally have a radius of about several tens of meters. Herein, a pico cell may be interchangeably used with the small cell.

In the case of a network including a macro cell, degradation of the quality of a received signal may occur due to a low strength of the received signal because a user equipment located in a cell edge is far from a base station. On the other hand, in the case of a network including a small cell, even the user equipment located in the cell edge is close to the base station, such that the strength of a mutual signal may be measured as being high, but due to frequent occurrence of inter-cell handover, a system load may be caused by the handover.

As shown in FIG. 1, in a dual connectivity network between small cells and macro cells, handover may be performed when movement of the user equipment occurs between macro cells, and a simple cell change process may be performed when movement occurs between small cells, thereby reducing a system load. Moreover, connection based on macro cells is maintained, thereby allowing stable cell change between small cells.

When dual connectivity is used, the throughput of the user equipment may be improved through inter-node radio resource aggregation (INRA) and mobility robustness may be enhanced through RRC diversity.

INRA may provide a service to the user equipment 500 for user-plane data transmission by aggregating radio resources provided by one or more NodeB for user-plane data transmission as shown in FIG. 1. To this end, a second NodeB 300 constituting a macro cell may be configured as a mobility anchor to reduce a signaling overhead with respect to a core network (CN).

RRC diversity is a technique for transmitting/receiving RRC signaling related to handover by a source/target cell, with which the user equipment 500 may maintain connection from at least one cell, thereby minimizing a radio link failure (RLF) and improving handover performance.

In this case, the first NodeB 100 and the second NodeB 300 may be any one of an eNB of LTE or a gNB of NR. One of the first NodeB 100 and the second NodeB 300 may be a master node (MN), and the other may be a secondary node (SN), in which for convenience of a description, illustration of control-plane data is omitted in the drawings.

The control-plane data may be signaled via the master node, and a control channel may be configured between the master node and the secondary node to exchange signaling with each other via the X2 interface. The master node, which is an eNB or a gNB, may interwork with a mobility management entity (MME) or an access and mobility function (AMF), in which interworking entity and target in a 5G network may be determined according to a network deployment scenario. The network deployment scenario will be described later.

The user equipment 500 that is dual-connected to the first NodeB 100 and the second NodeB 300 may receive user-plane data from the first NodeB 100 through a first carrier F1 and user-plane data from the second NodeB 300 through a second carrier F2. In dual connectivity, the user-plane data may be split from a PDCP layer of the master node or the secondary node, and an MCG bearer, an SCG bearer, or a split bearer may be used as a data radio bearer (DRB). In dual connectivity, a protocol and a bearer for user-plane data processing will be described later.

FIGS. 2A through 2D illustrate embodiments for supporting dual connectivity among network deployment options according to the 5G standards.

Among deployment options according to the 5G standard release 15, a type of a base station may include an eNB, an ng-eNB, an en-gNB, and a gNB. The eNB may mean an LTE eNB as a 4G base station, and the ng-eNB may mean an eNB interworkable with 5G Core (5GC) and a gNB. The en-gNB may mean a gNB interworkable with an evolved packet core (EPC) and an eNB, and the gNB may mean an NR gNB as a base station interworkable with 5G NR and 5GC.

Among the deployment options according to the 5G standard release 15, four options support dual connectivity, which include evolved universal terrestrial radio access (E-UTRA)-NR DC (EN-DC), NG-RAN E-UTRA-NR DC (NGEN-DC), NR-E-UTRA DC (NE-DC), and NR-NR DC (NR-DC).

Figure 2A:
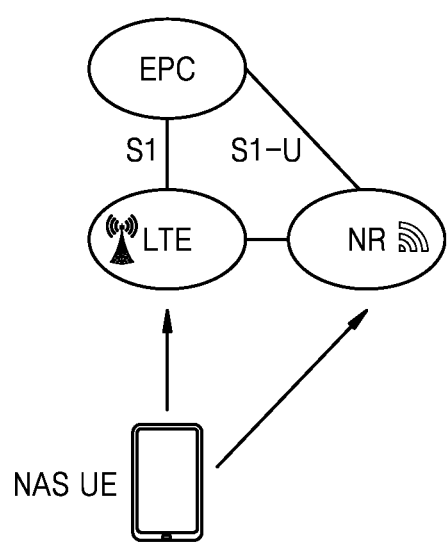
FIG. 2A illustrates network deployment of evolved universal terrestrial radio access (E-UTRA)-New Radio (NR) dual connectivity (DC) (EN-DC) among network deployment options according to the 5th-Generation (5G) standards.

FIG. 2A illustrates network deployment of EN-DC among network deployment options according to the 5G standards.

EN-DC corresponds to Deployment Option 3 according to the 5G standard release 15, in which an eNB is a master node, a gNB is a secondary node, and a core network is EPC.

Option 3 corresponds to a case where a gNB is introduced to an existing LTE infrastructure. The core network is EPC, and the gNB is an en-gNB interworkable with the EPC and the eNB. Dual connectivity (EN-DC) is supported between an eNB and an en-gNB, and the master node is an eNB. The eNB, which is a control anchor of the en-gNB, may process control signaling for a user equipment's access to a network, connection configuration, handover, etc., and deliver the user-plane data through the eNB and/or the en-gNB. As the LTE system is used, Option 3 corresponds to non-standalone (NSA).

The deployment type of Option 3 may include three Options 3/3a/3x according to a user-plane data split scheme. Options 3/3x may use a split bearer, and Option 3a may not use a split bearer.

Option 3: an eNB is connected to EPC, and an en-gNB is connected to an eNB. The user-plane data may be split from the master node and may be simultaneously transmitted through LTE and NR.

Option 3a: both an eNB and a gNB are connected to EPC, such that the user-plane data may be directly delivered from EPC to a gNB and may be transmitted to one of LTE or NR.

Option 3x: This is a combination of Option 3 and Option 3a, and is different from Option 3 in that the user-plane data is split from the secondary node.

Figure 2B:
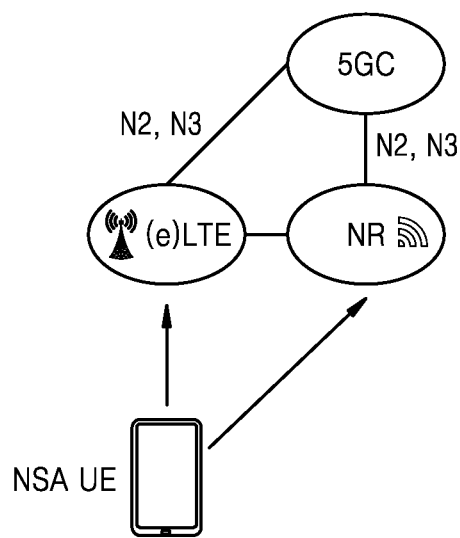
FIG. 2B illustrates network deployment of next-generation radio access network (NG-RAN) E-UTRA-NR DC (NGEN-DC) among network deployment options according to the 5G standards.

FIG. 2B illustrates network deployment of NGEN-DC among network deployment options according to the 5G standards.

NGEN-DC may correspond to deployment Option 7 according to the 5G standard release 15, in which the eNB is a master node, the gNB is a secondary node, and the core network is 5GC.

The core network may be 5GC, and the eNB may be an ng-eNB interworkable with the 5GC and the gNB. Dual connectivity (NGEN-DC) may be supported between an ng-eNB and a gNB, and the master node is an eNB. 5GC features may be used, and when a 5G coverage is not sufficient yet, the eNB may provide service continuity by using the eNB as the master node like in Option 3. As the LTE system is used, Option 7 may correspond to NSA.

The type of Option 7 may include three Options 7/7a/7x according to a user-plane data split scheme. Options 7/7x may use a split bearer, and Option 7a may not use a split bearer.

Figure 2C:
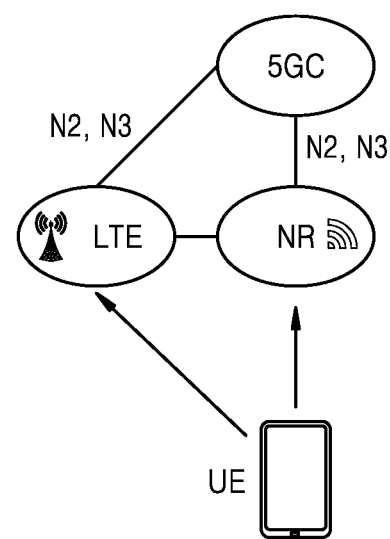
FIG. 2C illustrates network deployment of NR E-UTRA DC (NE-DC) among network deployment options according to the 5G standards.

FIG. 2C illustrates network deployment of NE-DC among network deployment options according to the 5G standards.

NE-DC may correspond to deployment Option 4 according to the 5G standard release 15, in which the gNB is a master node, the eNB is a secondary node, and the core network is 5GC.

The 5GC is introduced and NE-DC still interworks with LTE, but may also perform independent 5G communication. The core network may be 5GC, and the eNB may be an ng-eNB interworkable with the 5GC and the gNB. Dual connectivity (NE-DC) may be supported between an ng-eNB and a gNB, and the master node may be a gNB. In this case, a 5G NR coverage is sufficiently enlarged, LTE may be used as a capacity booster. The type of Option 4 may include two Options 4/4a.

Figure 2D:
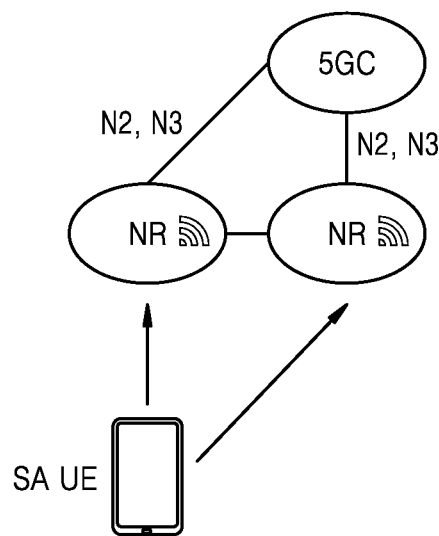
FIG. 2D illustrates network deployment of NR-DC among network deployment options according to the 5G standards.

FIG. 2D illustrates network deployment of NR-DC among network deployment options according to the 5G standards.

NR-DC may correspond to deployment Option 2 according to the 5G standard release 15, in which both the master node and the secondary node are gNBs and the core network is 5GC.

This option may be a deployment option capable of providing an independent 5G service merely with a 5G system (5GC and a gNB), and may be stand-alone (SA). Ultra-reliable low-latency communication (URLLC) and massive machine type communication (mMTC) in addition to an enhanced mobile broadband (eMBB) may be possible, and 5G features such as network slicing, mobile edge computing (MEC) support, etc., may be used, in which a complete 5G service may be provided and NR-DC may be a single RAT.

Figure 3:
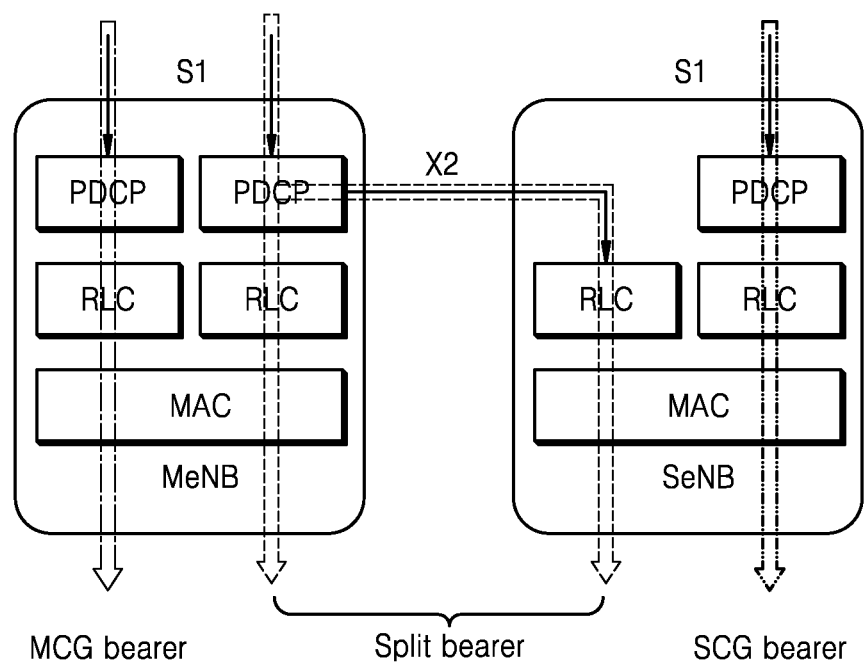
FIG. 3 illustrates various bearer types for dual connectivity.

FIG. 3 illustrates various bearer types for dual connectivity.

A user equipment may be configured to operate in a dual-connectivity operation mode, in which when a bearer (or a data radio bearer) established on a serving cell of a master node has a PDCP anchor point terminated in the master node, the bearer may be referred to as an MN-terminated MCG bearer, and when the bearer has a PDCP anchor point terminated in a secondary node, the bearer may be referred to as an SN-terminated MCG bearer.

Alternatively, when a bearer established on a serving cell of the secondary node has a PDCP anchor point terminated in the secondary node, the bearer may be referred to as an SN-terminated SCG bearer, and when the bearer has a PDCP anchor point terminated in the master node, the bearer may be referred to as an MN-terminated SCG bearer.

The user equipment may include a split bearer in which PDCP PDUs may be transmitted through two RLC entities established in the master node and the secondary node for the split bearer.

The PDCP anchor point of the split bearer may be configured to be terminated in any one of the master node or the secondary node, and a node in which the PDCP anchor point is terminated may be determined by the master node.

When the PDCP termination point of the split bearer is the master node, that bearer may be referred to as an MCG split bearer, and when the PDCP termination point of the split bearer is the secondary node, that bearer may be referred to as an SCG split bearer.

In the case of interworking between LTE and NR based on dual connectivity, that is, in the case of an EN-DC operation mode where the master node is an LTE eNB and the secondary node is an NR gNB, an MCG bearer may include any one of an LTE PDCP or an NR PDCP, an SCG bearer may be configured for the NR PDCP, and a split bearer may be configured for the NR PDCP regardless of a PDCP termination point.

However, in terms of the user equipment, there are three types of an MCG bearer, an SCG bearer, and a split bearer. The split bearer may be terminated in the master node, or may be terminated in the secondary node based on determination of the master node.

In EN-DC, the split bearer may include an NR PDCP container, LTE configurations on RLC, MAC, and physical layers, an NR configuration container on the RLC, MAC, and physical layers, etc.

The split bearer in which the PDCP termination point is in the master node may be referred to as an MN-terminated split bearer or an MCG split bearer. The split bearer in which the PDCP termination point is in the secondary node may be referred to as an SN-terminated split bearer or an SCG split bearer.

Figure 4:
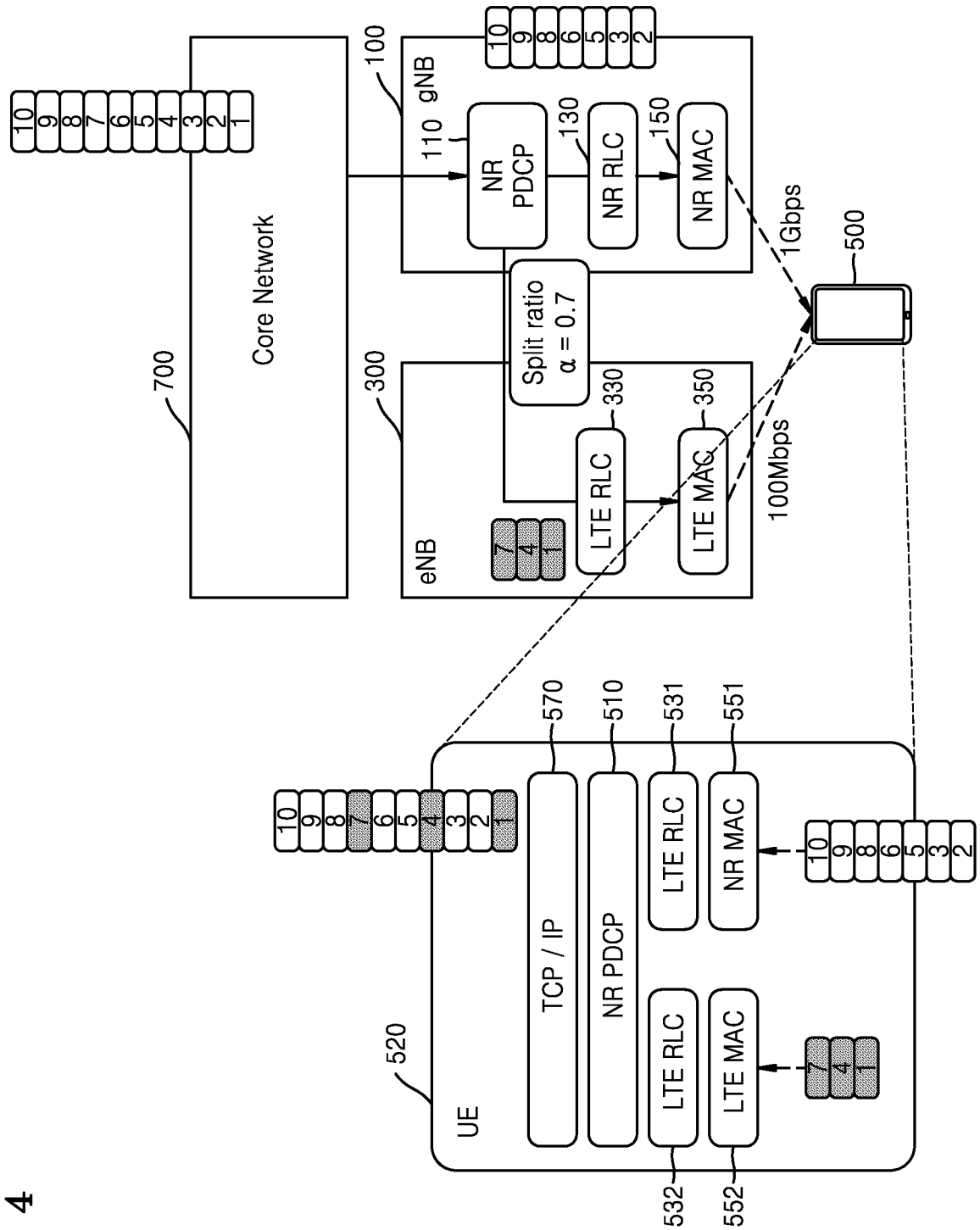
FIG. 4 illustrates an embodiment of a 5G NGEN-DC non-stand-alone (NSA) network architecture.

FIG. 4 illustrates an embodiment of a 5G NGEN-DC NSA network architecture.

Referring to FIG. 4, an NGEN-DC NSA network architecture may include a core network 700, a user equipment 500, a gNB 100, and an eNB 300.

In the NGEN-DC network architecture, the gNB 100 may correspond to the master node and an NR PDCP 110 of the gNB 100 may split user-plane data. The gNB 100 may include an NR PDCP 110, NR RLC 130, and NR MAC 150, and the eNB 300 may include an NR PDCP (not shown), LTE RLC 330, and LTE MAC 350. For other terminals where the eNB 300 is a master node, the NR PDCP of the eNB 300 may function as a split bearer, but in FIG. 4, illustration of the NR PDCP of the eNB 300 is omitted.

In the NGEN-DC network architecture, the core network 700 may correspond to 5GC and an architecture thereof will not be described in detail.

The user equipment 500 may include NR MAC 551 and NR RLC 531 which correspond to a protocol stack for processing data received from the gNB 100, and LTE MAC 552 and LTE RLC 532 which correspond to a protocol stack for processing data received from the eNB 300. The user equipment 500 may also include high-layer protocol stacks of an NR PDCP 510 and a transmission control protocol (TCP)/Internet protocol (IP) 570.

It is assumed that the NR PDCP 110 obtains 10 packets from the core network 700 and a split ratio of the split bearer is $\alpha=0.7$. For convenience of a description, the packets are given numbers from 1 to 10 according to a transmission order of each packet.

The split ratio, which means a split ratio of data to be transmitted to a master node and a secondary node, may be determined according to the amount of data to be transmitted, a service provider, a type of a service, transmission rates of the master node and the secondary node, a channel state, etc., and may be implemented in various ways. When the split ratio is determined wrong, a reordering delay occurs due to a packet reception delay, resulting in an increase in packet latency. Such an increase in packet latency may cause a loss based on expiration of the reordering timer to be described later.

The NR PDCP 110 may determine a packet to be transmitted to a user equipment (not shown) via the gNB 100 and a packet to be transmitted to the user equipment (not shown) via the eNB 300, according to the split ratio $\alpha$. In the embodiment illustrated in FIG. 4, the packets 2, 3, 5, 6, 8, 9, and 10 may be delivered from the NR PDCP 110 to the NR RLC 130, and the packets 1, 4, and 7 may be delivered from the NR PDCP 110 to the LTE RLC 330.

The NR RLC 130 may deliver the packets 2, 3, 5, 6, 8, 9, and 10 to the NR MAC 350, and the LTE RLC 330 may deliver the packets 1, 4, and 7 to the LTE MAC 350.

The user equipment 500 may identify packets received via a PHY layer according to a transmission entity to deliver the packets 2, 3, 5, 6, 8, 9, and 10 transmitted from the gNB 100 to the NR MAC 551 and the packets 1, 4, and 7 transmitted from the eNB 300 to the LTE MAC 552.

The NR MAC 551 and the LTE MAC 552 may deliver the obtained packets to the NR RLC 531 and the LTE RLC 532 which may deliver the obtained packets to the NR PDCP 510.

The NR PDCP 510 of the user equipment 500 may reorder the obtained packets such that the obtained packets are in order in the order that they are delivered in a transmission end PDCP, rather than in the order that they are received, and may deliver the reordered packets to the TCP/IP layer.

FIGS. 5A through 5E are views for describing a case where a reordering timer of a user equipment expires due to a packet reception delay, according to an embodiment of the disclosure.

In the embodiment illustrated in FIG. 4, when the NR PDCP 110 of the gNB 100 delivers the packets 2, 3, 5, 6, 8, 9, and 10 to the NR RLC 130 and the packets 1, 4, and 7 to the LTE RLC 330, the NR RLC 130 and the LTE RLC 330 may store received packets in a buffer and deliver them to the NR RLC 130 and the LTE RLC 330 according to a system state. In the embodiment of FIG. FIGS. 5A through 5E, every three packets received by the user equipment 500 may be grouped in the NR PDCP 510 and delivered to the TCP/IP 570.

Figure 5A:
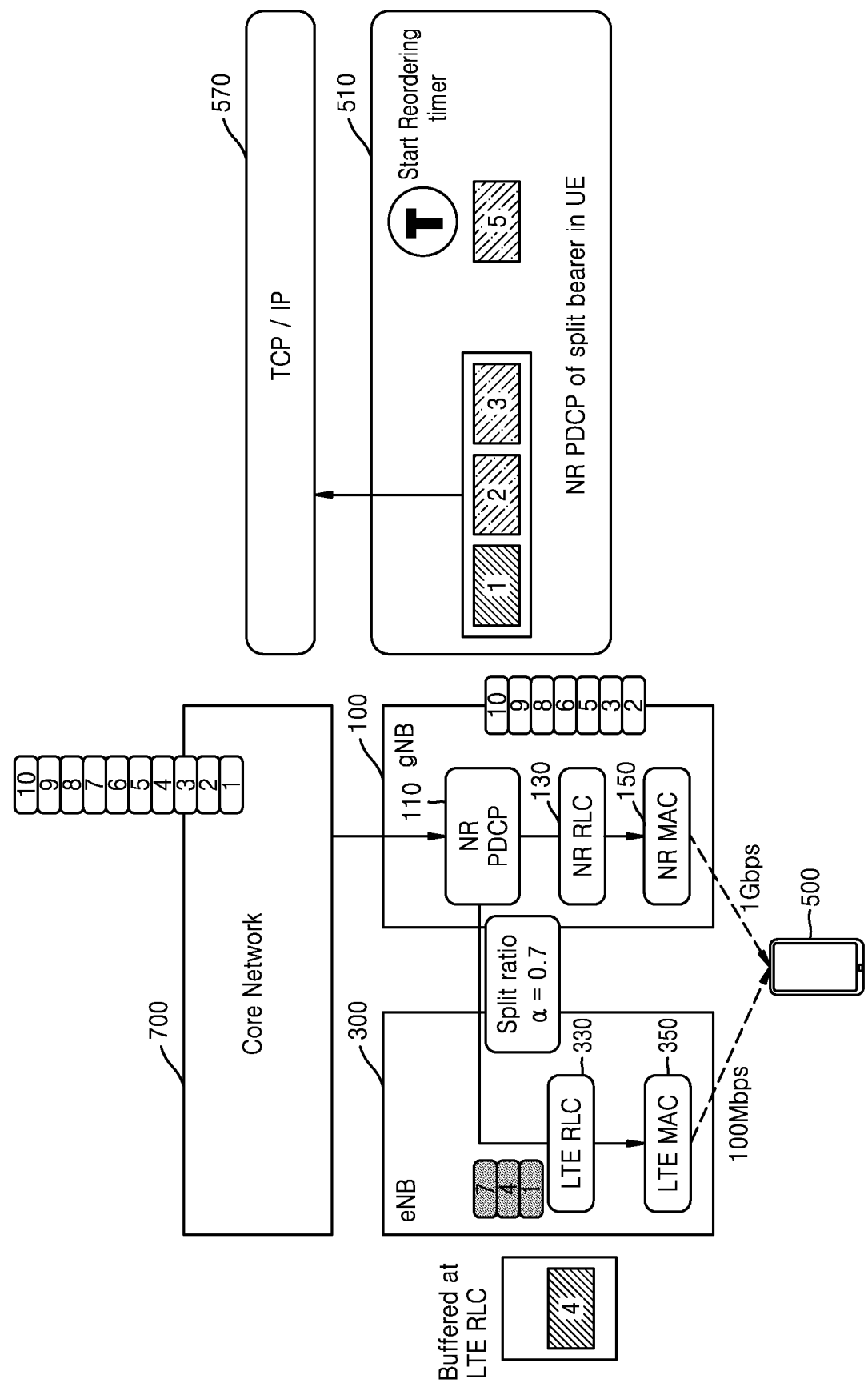
FIG. 5A illustrates a received-packet state of an NR packet data convergence protocol (PDCP) layer 510 of a user equipment 500 when reception of a packet 4 is delayed in an embodiment illustrated in FIG. 4.

FIG. 5A illustrates a received-packet state of the NR PDCP 510 layer of the user equipment 500 when reception of the packet 4 is delayed in the embodiment illustrated in FIG. 4.

Referring to FIG. 5A, delivery of the packet 4 is delayed in the LTE RLC 330 of the eNB 300, and as a result, the NR PDCP 510 of the user equipment 500 has received the packets 1, 2, 3, and 5. Thus, the NR PDCP 510 of the user equipment 500 may deliver the received packets 1, 2, and 3 to the TCP/IP 570 in which the packet 5 is received in a state where the packet 4 is not received, such that the user equipment 500 may start a reordering timer from a time in which the packet 5 is received, and wait for reception of the packet 4.

When the user equipment 500 waits for a non-received packet to deliver in order a packet to a high layer, the reordering timer may be used to determine a time for waiting for the packet. The reordering timer may be set upon generation of the non-received packet, and when that packet is not received for a preset time, the reordering timer may expire and the user equipment 500 may abandon reception of the packet and process the packet later.

However, in the description of FIGS. 5A through 5E, an example is used in which a cause for a delay in reception of the packet in the user equipment 500 is buffering in a transmission end (e.g., the gNB 100 or the eNB 300), but the disclosure is not limited thereto.

Figure 5B:
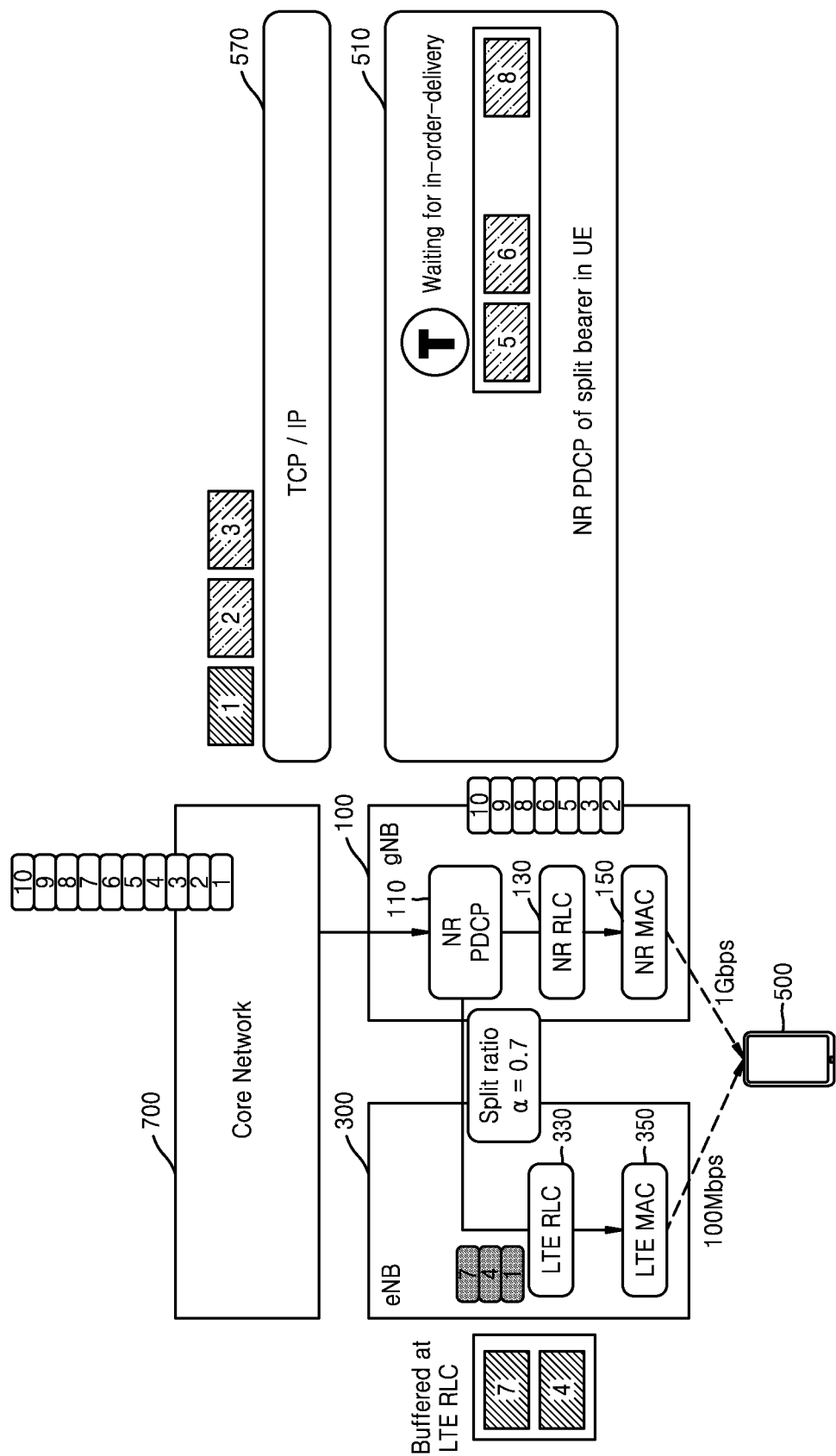
FIG. 5B illustrates a received-packet state of the NR PDCP layer 510 of the user equipment 500 when reception of a packet 7 is delayed after the state of FIG. 5A.

FIG. 5B illustrates a received-packet state of the NR PDCP layer 510 of the user equipment 500 when reception of the packet 7 is delayed after the state of FIG. 5A.

Referring to FIG. 5B, delivery of the packet 7 is delayed in the LTE RLC 330 of the eNB 300, and the NR PDCP 510 of the user equipment 500 has received the packets 5, 6, and 8. In this case, the packets 1, 2, and 3 already delivered to the TCP/IP 570 will not be described.

The earliest packet 4 between non-received packets, the packet 4 and the packet 7, has not yet been received, such that the reordering timer continues and the NR PDCP 510 of the user equipment 500 may continuously wait for reception of the packet 4.

Figure 5C:
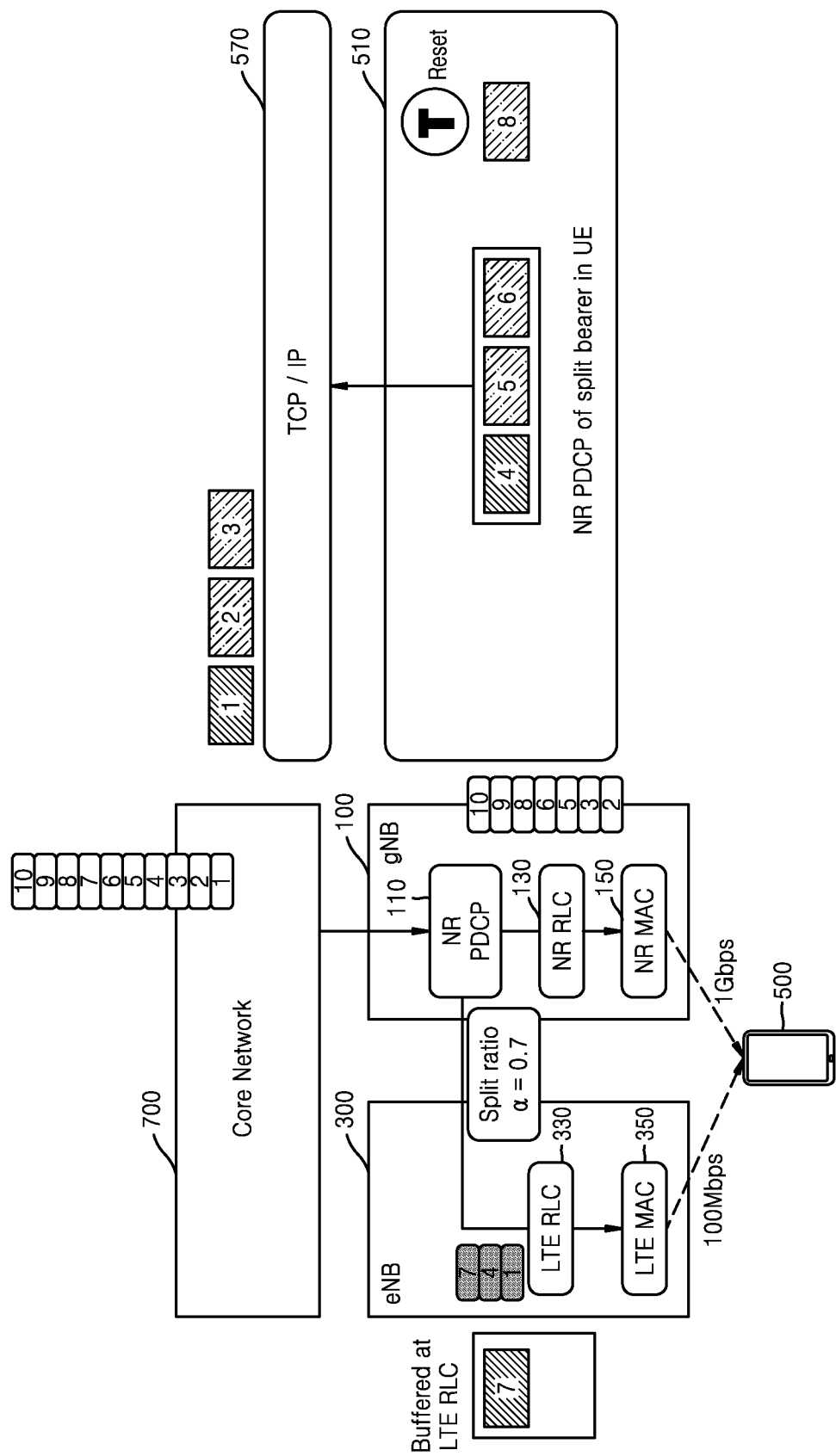
FIG. 5C illustrates a received-packet state of the NR PDCP layer 510 of the user equipment 500 when the packet 4 is received after the state of FIG. 5B.

FIG. 5C illustrates a received-packet state of the NR PDCP layer 510 of the user equipment 500 when the packet 4 is received after the state of FIG. 5B.

Referring to FIG. 5C, after the state of FIG. 5B, the packet 4 may be delivered from the LTE RLC 330 of the eNB 300 to the LTE MAC 350, and then the NR PDCP 510 of the user equipment 500 may have successfully received the packet 4.

The NR PDCP 510 of the user equipment 500 may deliver the received packets 4, 5 and 6 to the TCP/IP 570 upon reception of the packet 4 the user equipment 500 is waiting for receiving, and the user equipment 500 may reset the reordering timer and wait for reception of the packet 7 due to reception of the packet 4 having triggered the reordering timer. A reference time in which the reordering timer is reset may be set to a time in which the packet 8 that follows a non-received packet is received.

Figure 5D:
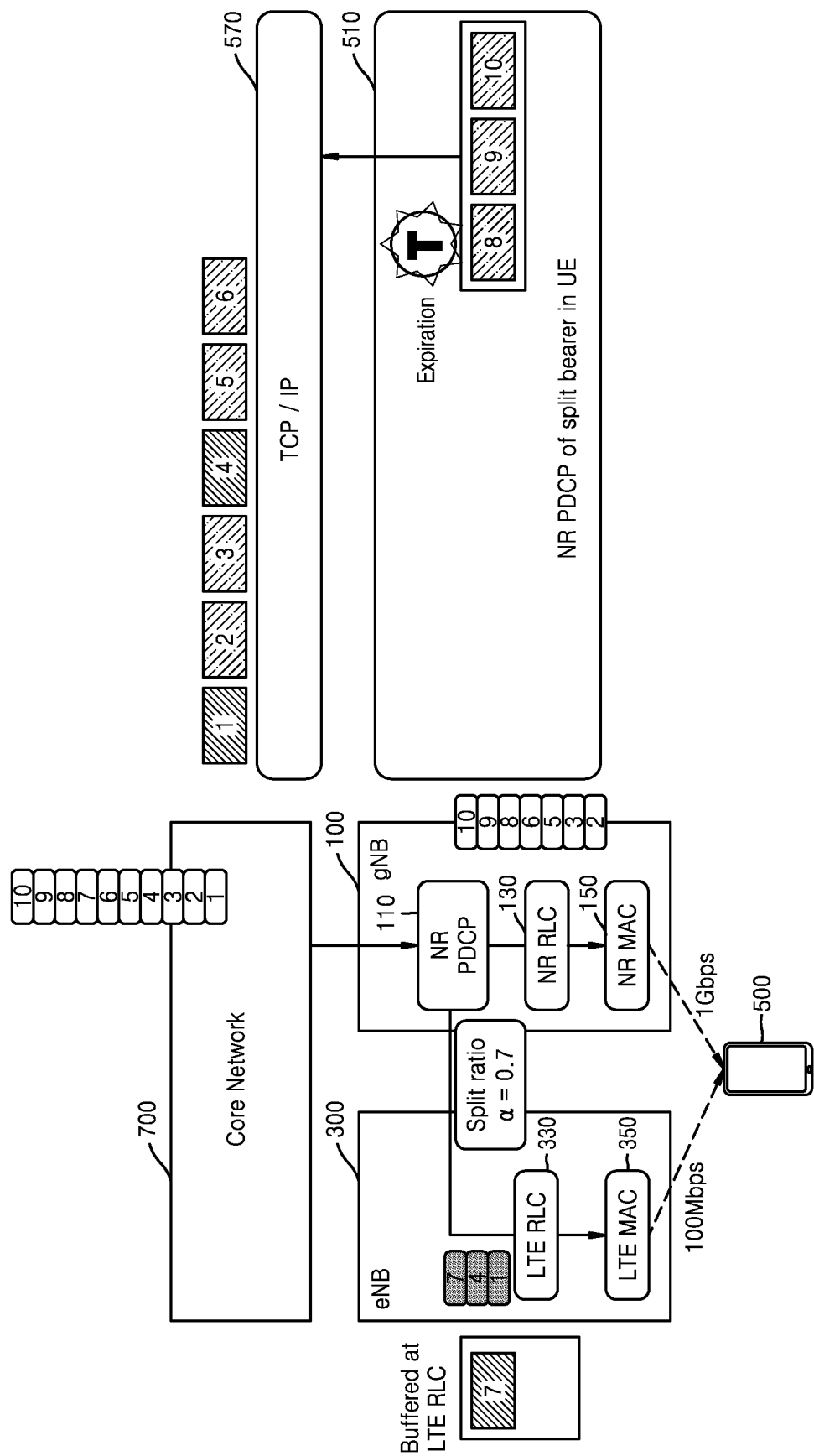
FIG. 5D illustrates a received-packet state of the NR PDCP layer 510 of the user equipment 500 in the case of expiration of a reordering timer after the state of FIG. 5C.

FIG. 5D illustrates a received-packet state of the NR PDCP layer 510 of the user equipment 500 in the case of expiration of the reordering timer after the state of FIG. 5C.

Referring to FIG. 5D, even after the state of FIG. 5C, delivery of the packet 7 is continuously delayed in the LTE RLC 330 of the eNB 300, in which the NR PDCP 510 of the user equipment 500 has received the packets 8, 9, and 10. Likewise, a description of the packets 1, 2, 3, 4, 5, and 6 already delivered to the TCP/IP 570 will be omitted.

When the packet 7 is not received until expiration of the reordering timer starting from a time in which the packet 8 is received, due to lengthening of a delay in reception of the packet 7, the NR PDCP 510 of the user equipment 500 may abandon reception of the packet 7 and deliver the subsequent packets 8, 9, and 10 to the TCP/IP 570.

Figure 5E:
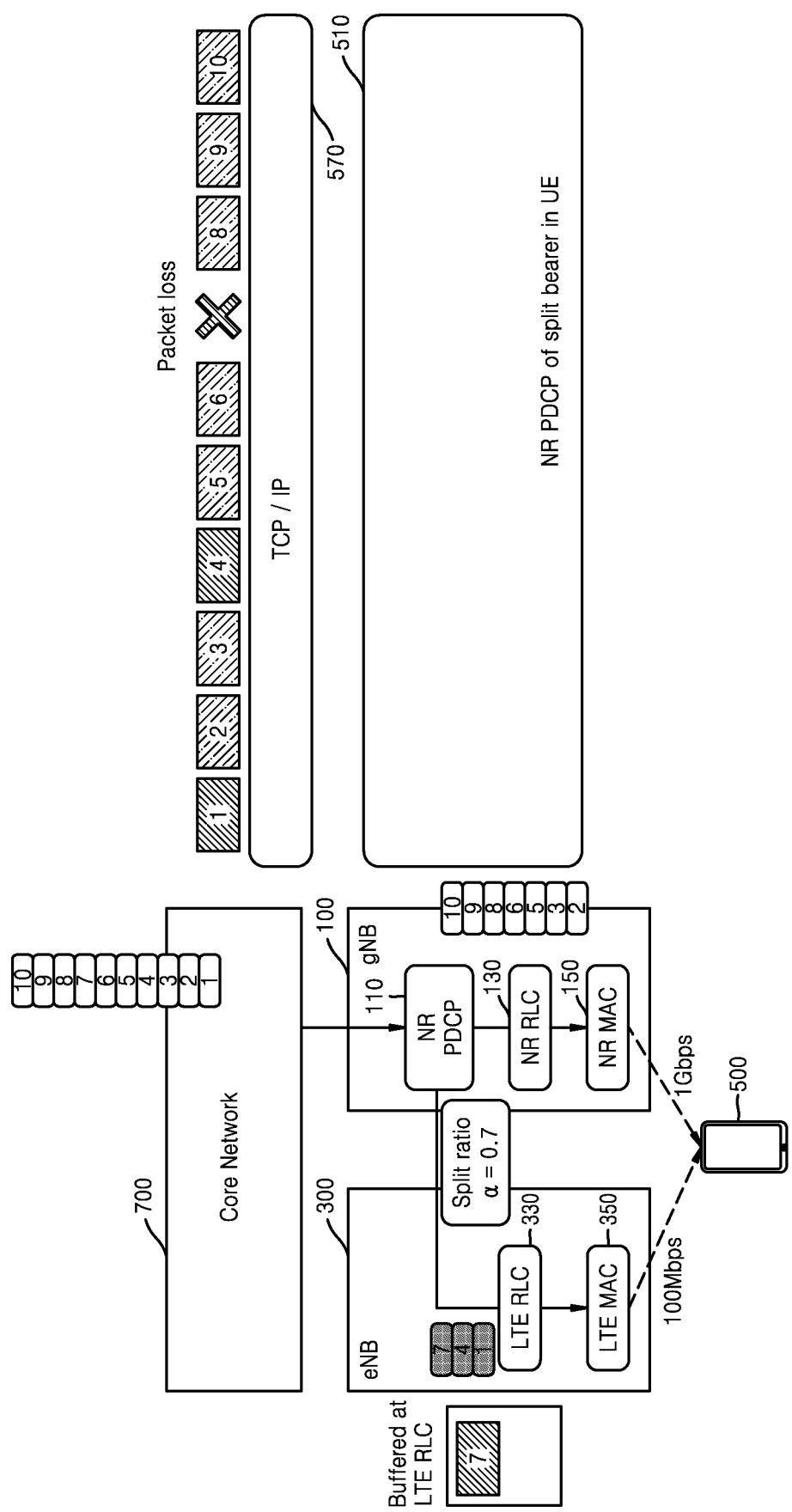
FIG. 5E illustrates a received-packet state of a transmission control protocol (TCP)/Internet protocol (IP) layer 570 of the user equipment 500 in an embodiment illustrated in FIG. 5D.

FIG. 5E illustrates a received-packet state of the TCP/IP 570 layer of the user equipment 500 in the embodiment illustrated in FIG. 5D.

After the NR PDCP 510 of the user equipment 500 abandons reception of the packet 7 and delivers the packets 8, 9, and 10 to the TCP/IP 570 due to expiration of the reordering timer for the packet 7, a loss of the packet 7 occurs in the TCP/IP 570. Upon expiration of the reordering timer, not only the packet 7, but also consecutive packets transmitted through the same cell group after the packet 7 are discarded together, causing massive data loss in a reception end.

Moreover, when a packet is lost due to expiration of the reordering timer, a TCP congestion control algorithm operates due to occurrence of retransmission time out (RTO) in the transmission end, sharply reducing a TCP throughput.

When expiration of the reordering timer is expected, upon retransmission of a packet triggering the reordering timer, i.e., a reception-delayed packet, through a node that is different from an existing node, expiration of the reordering timer may be prevented in the user equipment and massive data loss and transmission rate loss caused by expiration of the reordering timer may be reduced.

FIG. 6 is an operating flowchart of a wireless communication system, according to an embodiment of the disclosure.

Referring to FIG. 6, the wireless communication system according to an embodiment of the disclosure may include a first cell group 100, a second cell group 300, and the user equipment 500.

In a dual connectivity environment, the user equipment 500 may be connected to two cell groups which may be controlled and managed by one split bearer. Splitting, i.e., data splitting may be performed in a PDCP, and the split data may be delivered through RLC, MAC, and PHY of each of the two cell groups.

In an embodiment of the disclosure, the PDCP may be included in any one of the first cell group 100 or the second cell group 300, but in FIG. 3, the PDCP may be included in the first cell group 100.

In operation S610, the first cell group 100 may obtain at least one packet to be transmitted from a core network (not shown) to the user equipment 500.

The core network may mean a high-layer network of an RAN, and may be any one of EPC or 5GC.

In operation S620, the first cell group 100 may determine a packet to be transmitted to the user equipment 500 via the first cell group 100 and a packet to be transmitted to the user equipment 500 via the second cell group 300, among packets obtained from the core network (not shown).

A split bearer may classify data to be transmitted to the first cell group 100 and data to be transmitted to the second cell group 300, according to a data split ratio.

The data split ratio may be determined based on at least one of a parameter for a service quality or a parameter for system requirements (a quality of service (QoS) class identifier (QCI)), a guaranteed bit rate (GRP), an allocation and retention priority (ARP), a maximum bit rate (MBR), an access point name-aggregate maximum bit rate (APN-AMBR), or a user equipment-aggregate maximum bit rate (UE-AMBR).

As described above, in the embodiment shown in FIG. 6, the PDCP may be included in the first cell group 100, and the split bearer may perform duplication and routing of data in a transmission PDCP entity, i.e., the PDCP of the first cell group 100.

In operation S621, the first cell group 100 (e.g., the PDCP) may deliver (S621) a packet to be transmitted to the user equipment 500 via the second cell group 300 (e.g., the RLC) to the second cell group 300, and deliver (not shown)

a packet to be transmitted to the user equipment 500 via the first cell group 100 to a low layer (e.g., the RLC) of the first cell group 100.

When submission of a PDCP PDU is requested from a low layer in the split bearer, the transmission PDCP entity may deliver data to two acknowledged mode (AM) RLCs by using a protocol defined in the system.

The second cell group 300 may obtain a packet to be transmitted to the user equipment 500 via the second cell group 300 in operation S630, and the second cell group 300 may transmit the obtained packet to the user equipment 500 through MAC and PHY in operation S631.

In operation S631, the user equipment 500 may receive the packet from the second cell group 300 and receive (not shown) the packet from the first cell group 100.

A reception PDCP entity, i.e., the PDCP of the user equipment 500 may perform reordering of received data and discarding of data that has been completely delivered to a high layer.

According to an embodiment of the disclosure, a packet transmitted from the core network to the user equipment 500 may be transmitted to the user equipment 500 from the first cell group 100 and the second cell group 300 in the foregoing process. In this case, an environment of a wireless network between the first cell group 100 and the user equipment 500 and an environment of a wireless network between the second cell group 300 and the user equipment 500 may be different from each other. Even in a wireless network between one cell group and the user equipment 500, a wireless network environment of a time-frequency resource block in which each packet is delivered may differ.

Thus, each packet may have a different time delay according to a wireless network environment, and an order in which the packet is received in the user equipment 500 may be different from a transmission order of the packet. The user equipment 500 may process received packets through a user-plane protocol of PHY, MAC, RLC, PDCP, and TCP/IP. In this case, the PDCP of the user equipment 500 may reorder the received packets such that they are in order in the order that they are delivered in a transmission end PDCP, rather than in the order that they are received, and may deliver the reordered packets to the TCP/IP layer.

In operation S640, the user equipment 500 may wait for reception of a non-received packet and set a reordering timer to deliver received packets in-order to the TCP/IP layer when there is the non-received packet from the second cell group 300.

In operation S641, the user equipment 500 may feed information about a state of the packets received from the second cell group 300 back to the second cell group 300. According to an embodiment of the disclosure, the information about the state of the packets received from the second cell group 300, which is fed back by the user equipment 500, may include an HARQ feedback in an HARQ process.

In operation S650, the second cell group 300 may update packet delivery state information of the second cell group 300 based on the information about the packet state fed back from the user equipment 500.

According to an embodiment of the disclosure, the packet delivery state information may include a downlink data delivery status (DDDS). The DDDS may include information delivered from a distribution unit (DU) of a NodeB to a central unit (CU), and may mean periodic feedback information that enables an NR PDCP included in the CU to control a user data flow through the DU.

Each node, i.e., each base station may be split into two parts of the CPU and the DU which are connected via an F1 interface. For example, a PDCP layer may be included in the CU and RLC, MAC, and PHY layers are included in the DU in a 5G network, but configurations of the CU and the DU are not limited thereto and may differ according to how to implement the system. According to another embodiment of the disclosure, the base station may be split into the CU, the DU, and a radio unit (RU).

By identifying the CU and the DU, network functions may be virtualized, leading to improvement of the flexibility of system implementation and reduction of cost. For example, even when virtualization of a low layer is difficult to achieve, the low layer (the DU) and the high layer (the CU, e.g., a layer higher than the PDCP) may be split, such that a high layer may be implemented as an open-type protocol stack.

In operation S651, the second cell group 300 may transmit the updated packet delivery state information to the first cell group 100.

In operation S660, the first cell group 100 may determine whether to perform packet retransmission based on the packet delivery state information of the second cell group 300.

More specifically, the RLC of the first cell group 100 may deliver the packet delivery state information obtained from the second cell group 300 to the PDCP, and the PDCP having obtained the packet delivery state information of the second cell group 300 from the RLC may determine whether to retransmit a packet not received in the user equipment 500, i.e., a packet the user equipment 500 is waiting for receiving, based on the packet delivery state information of the second cell group 300.

When a certain packet is not received and thus reception of the packet is waited for in-order packet delivery, the unconditional wait for reception of the packet may be inefficient for management of wireless communication resources. Thus, when the packet is not received until an elapse of a certain time after setting of the reordering timer, the user equipment 500 may discard the packet without waiting for reception of the packet and process subsequent packets.

However, in this case, not only the packet, but also consecutive packets transmitted through the same cell group after the packet may be discarded together, causing massive data loss in a reception end. Moreover, when a packet is lost due to expiration of the reordering timer, a TCP congestion control algorithm may operate due to occurrence of RTO in the transmission end, sharply reducing a TCP throughput.

The TCP congestion control algorithm may mean a technique for controlling an operation of each entity not to aggravate network congestion by determining that a packet loss is caused by network congestion.

A limited congestion control scheme may apply a Karn algorithm by considering a round trip time (RTT) deviation, and operate to double an RTO time for congestion control upon occurrence of retransmission.

A comprehensive congestion control scheme may operate in a slow start mode upon occurrence of RTO to deliver data at a low data transmission rate in the early stage of connection and to gradually rapidly increase the amount of transmission data, thereby suppressing a segment transmission rate in advance. Thereafter, congestion avoidance, fast retransmission, and fast recovery may be used together, thereby controlling a data transmission rate.

Thus, a TPC transmission rate sharply decreases upon expiration of the reordering timer, such that the PDCP may retransmit a packet before expiration of the reordering timer to allow the user equipment 500 to receive the packet.

A detailed method of determining whether to retransmit a packet according to an embodiment of the disclosure will be described later.

When packet retransmission is determined in operation S660, the first cell group 100 may transmit a packet that is determined to be retransmitted to the user equipment 500 via the first cell group 100 in operation S661.

More specifically, when packet retransmission is determined, the PDCP may duplicate the packet to transmit the determined packet via the first cell group 100 and transmit the packet through a user-plane protocol of the first cell group 100.

In operation S670, the user equipment 500 having received the packet retransmitted from the first cell group 100 may deliver the retransmitted packet to a high layer and in-order deliver subsequent packets to a high layer.

A reception PDCP entity, i.e., the PDCP of the user equipment 500 may perform reordering of received data and discarding of the received data.

For example, upon delivery of the PDU to the PDCP from the low layer, the user equipment 500 may determine an order of received packets based on a PDCP sequence number (SN) of a packet received in a data PDU, a PDCP SN of an adjacent previous packet, and a PDCP SN of a next packet.

In this case, the reordering timer set in operation S640 may be reset (or may restart), and upon occurrence of a packet reception wait situation for in-order delivery, the reordering timer may be reset.

Although not shown in FIG. 6, the packet determined to be transmitted via the first cell group 100 in operation S620 may be transmitted to the user equipment 500 through RLC, MAC, and PHY of the first cell group 100. When the packet transmitted to the user equipment 500 via the first cell group 100 is not received, the user equipment 500 may feed the information about the state of received packets back to the first cell group 100.

The first cell group 100 may update packet delivery state information of the first cell group 100 based on the information about the state of the packets received from the user equipment 500, and may determine whether to retransmit the packet based on the updated packet delivery state information. When packet retransmission is determined, the first cell group 100 may duplicate the packet determined to be retransmitted and deliver the packet to the second cell group 300 which may retransmit the packet to the user equipment 500.

That is, according to an embodiment of the disclosure, based on whether transmission of the PDCP PDU delivered from the RLC to the PDCP through the DDDS is successful, the state of packets may be managed in the PDCP, expiration of the reordering timer may be predicted, and when expiration of the reordering timer is expected, the packet starting the reordering timer may be duplicated and retransmitted, thereby preventing a loss of the packet.

Figure 7:
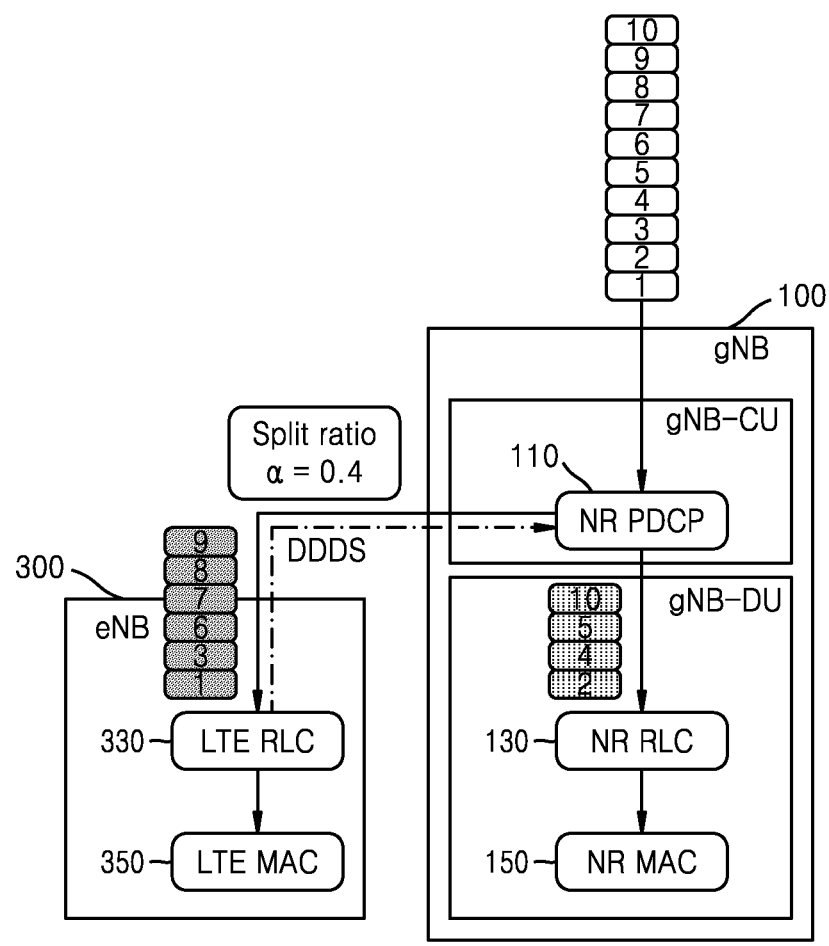
FIG. 7 illustrates an embodiment of a split bearer in an NGEN-DC NSA network, according to an embodiment of the disclosure.
Figure 8A:
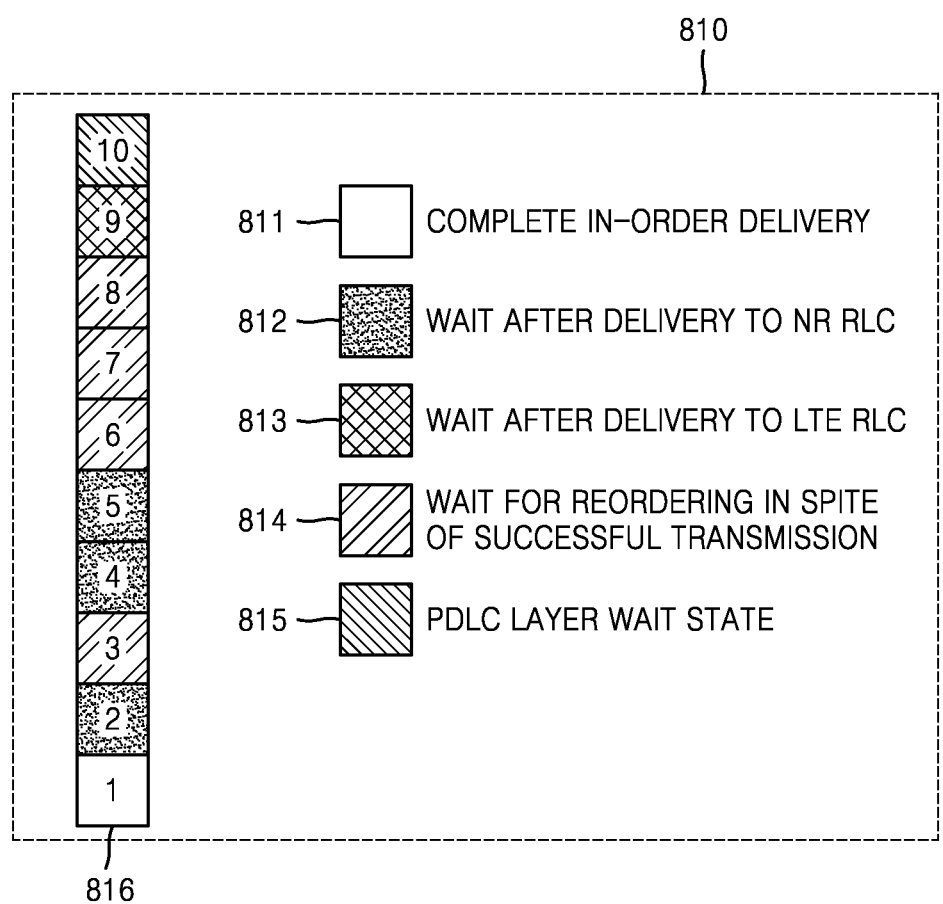
FIG. 8A illustrates a downlink packet state managed in a PDCP 110, in the embodiment illustrated in FIG. 7.
Figure 8B:
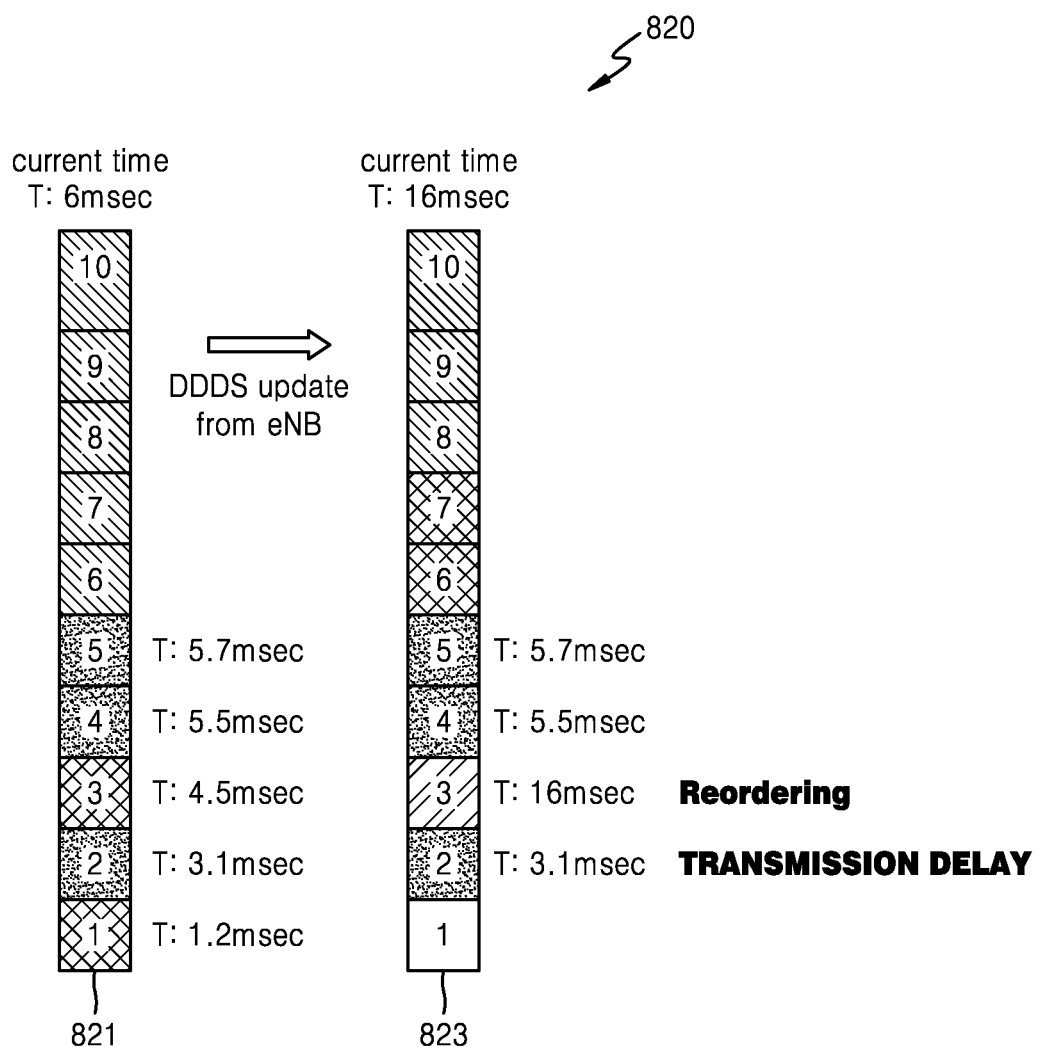
FIG. 8B is a view for describing a case where a downlink packet state managed in the PDCP 110 is updated, in the embodiment illustrated in FIG. 7.
Figure 8C:
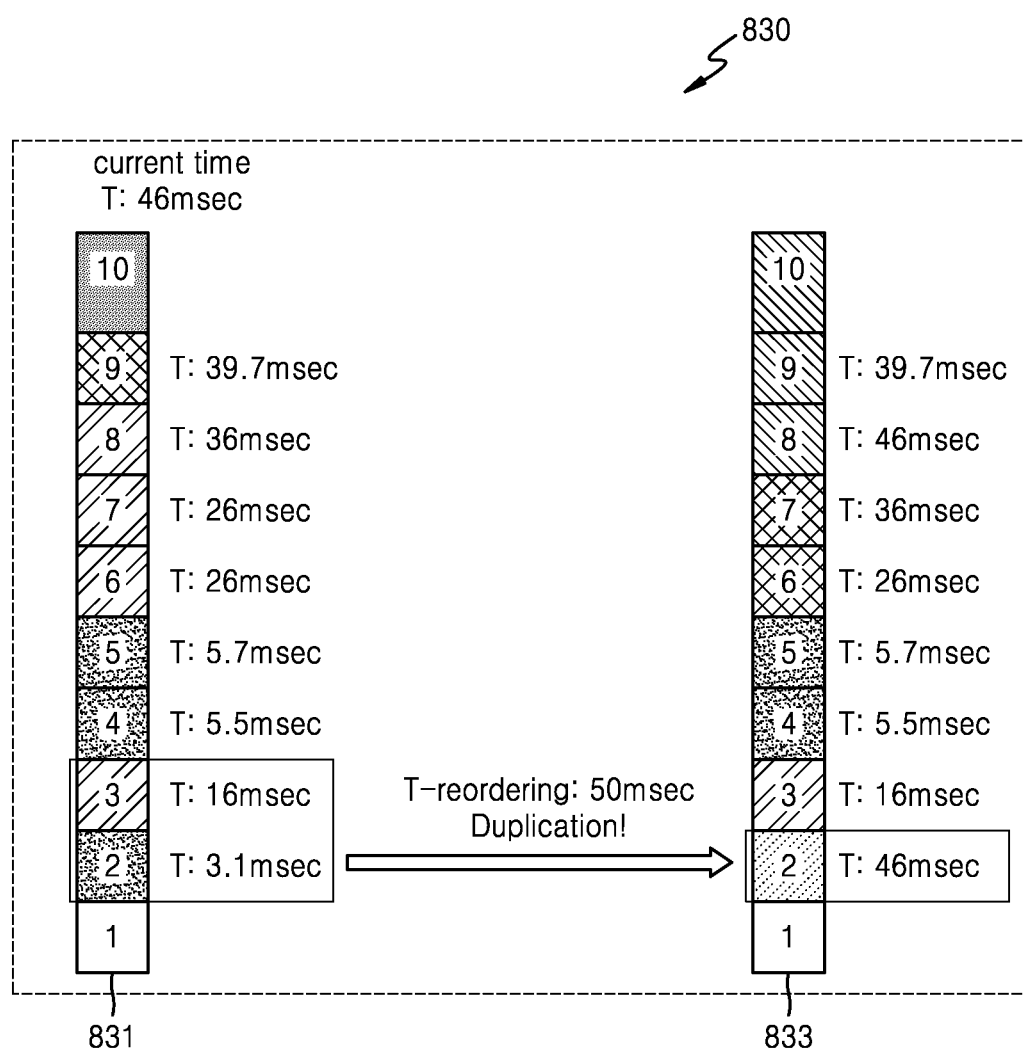
FIG. 8C is a view for describing a method of duplicating and retransmitting a packet based on a downlink packet state managed in the PDCP 110 before expiration of a reordering timer, in the embodiment illustrated in FIG. 7.
Figure 8D:
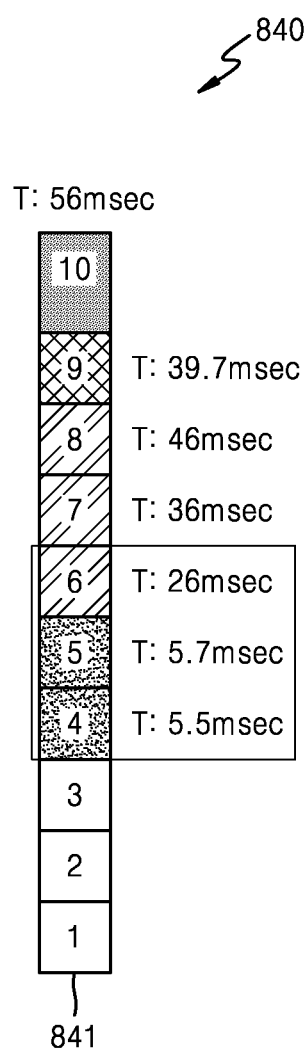
FIG. 8D is a view for describing a downlink packet state managed in the PDCP 110 after packet retransmission, in an embodiment illustrated in FIG. 8C.

FIGS. 7 through 8D are views for describing a data transmission method in a wireless communication system, according to an embodiment of the disclosure.

FIG. 7 illustrates an embodiment of a split bearer in an NGEN-DC NSA network, according to an embodiment of the disclosure.

Referring to FIG. 7, the wireless communication system according to an embodiment of the disclosure may include the gNB 100 and the eNB 300, and the NR PDCP for data splitting may be included in the gNB 100 due to an NGEN-DC network architecture. The gNB 100 may include the NR PDCP 110, the NR RLC 130, and the NR MAC 150, and the eNB 300 may include the NR PDCP (not shown), the LTE RLC 330, and the LTE MAC 350. For other terminals where the eNB 300 is a master node, the NR PDCP of the eNB 300 may function as a split bearer, but in FIG. 7, illustration of the NR PDCP of the eNB 300 is omitted.

While a description will be described by referring to a certain network (e.g., NGEN-DC NSA) for convenience herein, a network architecture to which the disclosure is applicable is not limited thereto, and the disclosure is applicable to any network system supporting dual connectivity and using a split bearer.

It is assumed that the NR PDCP 110 obtains 10 packets from the core network (not shown) and a split ratio of the split bearer is α=0.4. For convenience of a description, the packets are given numbers from 1 to 10 according to a transmission order of each packet.

The NR PDCP 110 may determine a packet to be transmitted to a user equipment (not shown) via the gNB 100 and a packet to be transmitted to the user equipment (not shown) via the eNB 300, according to the split ratio α. In an embodiment illustrated in FIG. 7, the packets 2, 4, 5, and 10 may be delivered to the NR RLC 130, and the packets 1, 3, 6, 7, 8, and 9 may be delivered to the LTE RLC 330.

The NR RLC 130 may deliver the packets 2, 4, 5, and 10 to the NR MAC 350 and store a packet delivery state in a DDDS. Thereafter, when information about each packet reception state is fed back from a user equipment (not shown), the DDDS may be updated based on the fed information and the updated DDDS may be delivered to the NR PDCP 110.

Likewise, the LTE RLC 330 may deliver the packets 1, 3, 6, 7, 8, and 9 to the LTE MAC 350 and store a packet delivery state in the DDDS. Thereafter, when information about each packet reception state is fed back from the user equipment (not shown), the DDDS may be updated based on the fed information and the updated DDDS may be delivered to the NR PDCP 110.

The NR PDCP 110 having obtained the DDDS of the NR RLC 130 and the DDDS of the LTE RLC 330 may manage a downlink packet state based on the DDDS of the NR RLC 130 and the DDDS of the LTE RLC 330.

$$T_{reordertimer} - (T_{real} - T_{reorder}) < TH_{duplication} \qquad \text{[Equation 1]}$$

In an embodiment illustrated in FIG. 8C, $T_{real}$ may be about 46 ms, $T_{reorder}$ may be about 16 ms, and $T_{reorder}$ may be about 50 ms.

Thus, the left side of Equation 1 may be equal to about 20 ms, and when this value is less than a threshold value $TH_{duplication}$ set in the system, the NR PDCP may duplicate the packet 2 causing a reception delay and retransmit the packet 2 to the gNB. 833 may indicate a state of each of first through tenth packets after packet retransmission when the current time is 46 msec. For convenience of a description, the packets are given numbers from 1 to 10 according to a transmission order of each packet.

Expiration of the reordering timer after 20 msec is expected, such that a data transmission apparatus according to an embodiment of the disclosure may duplicate the packet 2 delayed in reception in the user equipment and retransmit the packet 2 to the gNB 100.

FIG. 8D is a view for describing a downlink packet state managed in the NR PDCP 110 after packet retransmission, in the embodiment illustrated in FIG. 8C.

In the embodiment illustrated in FIG. 8C, the NR PDCP 110 may duplicate the packet 2 delayed in reception in the user equipment and retransmit the packet 2 to the gNB 100. The user equipment may receive the packet 2 and feed an acknowledgement (ACK) regarding the reception of the packet 2 back to the gNB 100, and the NR RLC 130 may deliver the DDDS updated based on feedback information to the NR PDCP 110.

Thereafter, it may be seen from a downlink packet state 841 managed by the PDCP 110 at the current time of 56 msec that the state of the packet 2 delayed in reception and the state of the packet 3 waiting for in-order delivery are updated to an in-order delivery completed state.

Figure 9:
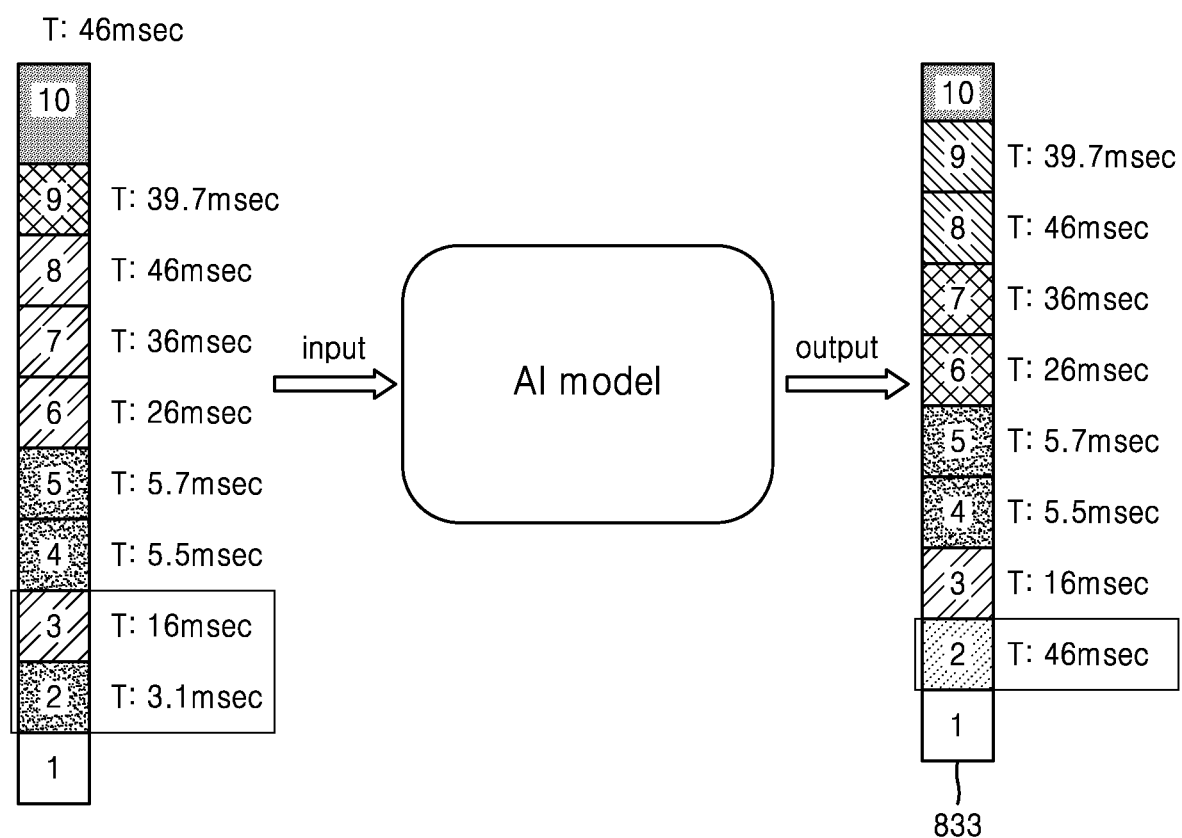
FIG. 9 is a view for describing a determination method for a cell group to duplicate and retransmit a packet, according to an embodiment of the disclosure.

FIG. 9 is a view for describing a determination method for a cell group to duplicate and retransmit a packet, according to an embodiment of the disclosure.

FIG. 8C illustrates an embodiment where duplication of a transmission-delayed packet is performed when a reordering duration, i.e., an elapse from the start of reordering, $T_{reorder} - T_{real}$, is greater than a difference between a reordering timer set value $T_{reordertime}$ and a certain threshold value $TH_{duplication}$.

According to another embodiment of the disclosure, a split bearer (or an NR PDCP) may determine whether to duplicate a transmission-delayed packet by using an artificial intelligence (AI) model. In this case, the AI model may be trained by receiving information (e.g., 831 of FIG. 8C) about a current packet transmission state as an input, and determine whether to duplicate a packet (e.g., 833 of FIG. 8C) based on the trained AI model. An RLC buffer state may be used as an additional input.

Figure 10:
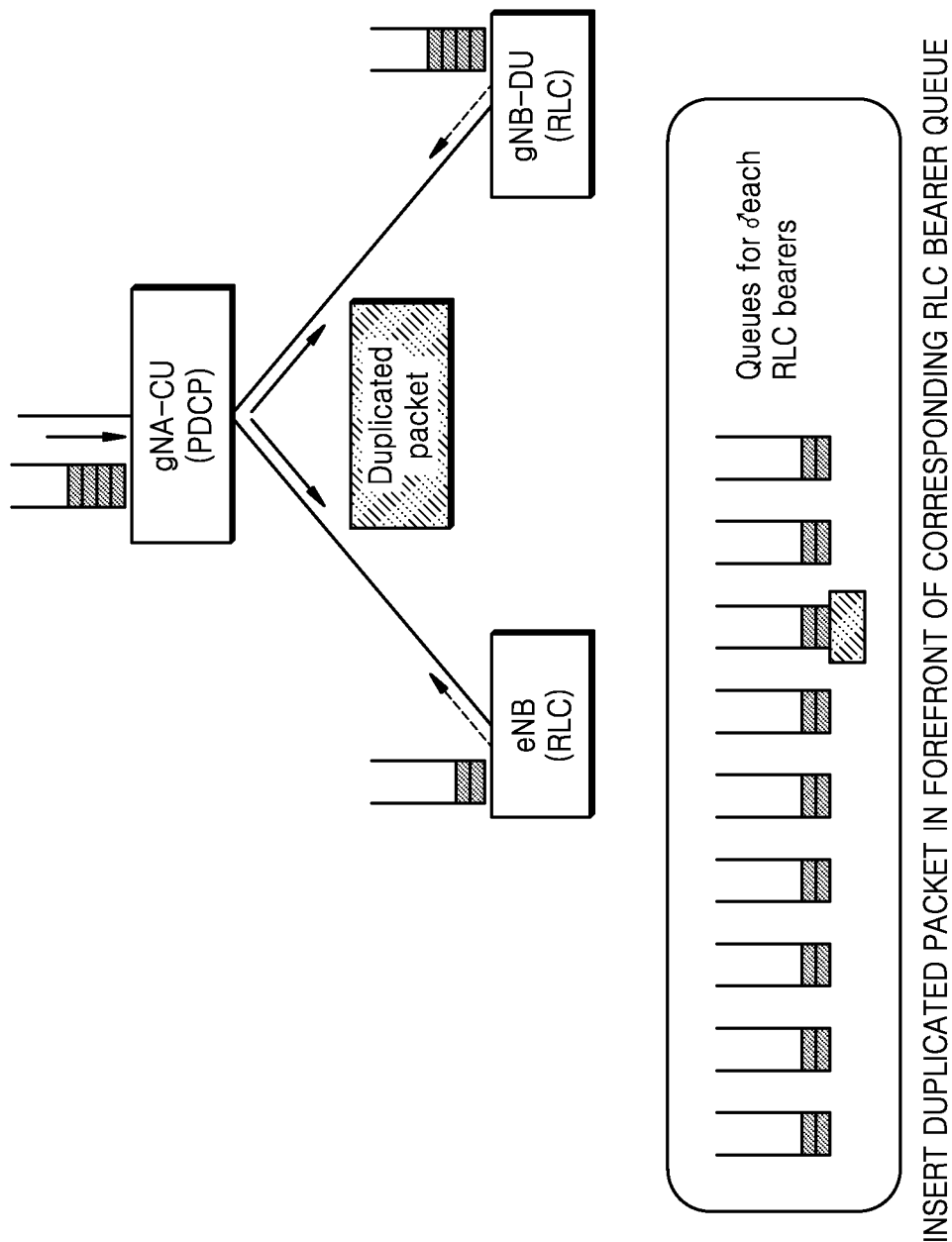
FIG. 10 is a view for describing a method by which a cell group retransmits a duplicated packet, according to an embodiment of the disclosure.

FIG. 10 is a view for describing a method by which a cell group retransmits a duplicated packet, according to an embodiment of the disclosure.

A packet determined to be duplicated according to the above-described methods is likely to cause expiration of the reordering timer due to a reception delay in the user equipment. Thus, when expiration of the reordering timer is expected, a transmission priority may be given to a duplicated packet that is likely to cause expiration of the reordering timer.

In this case, the PDCP may indicate that the packet is a duplicated packet and deliver the duplicated packet to the RLC which may identify the indication and insert the packet into the forefront of an RLC buffer queue to transmit the packet preferentially over other packets when the packet is the duplicated packet. For the indication as the duplicated packet, a separate control bit may be added.

Figure 11:
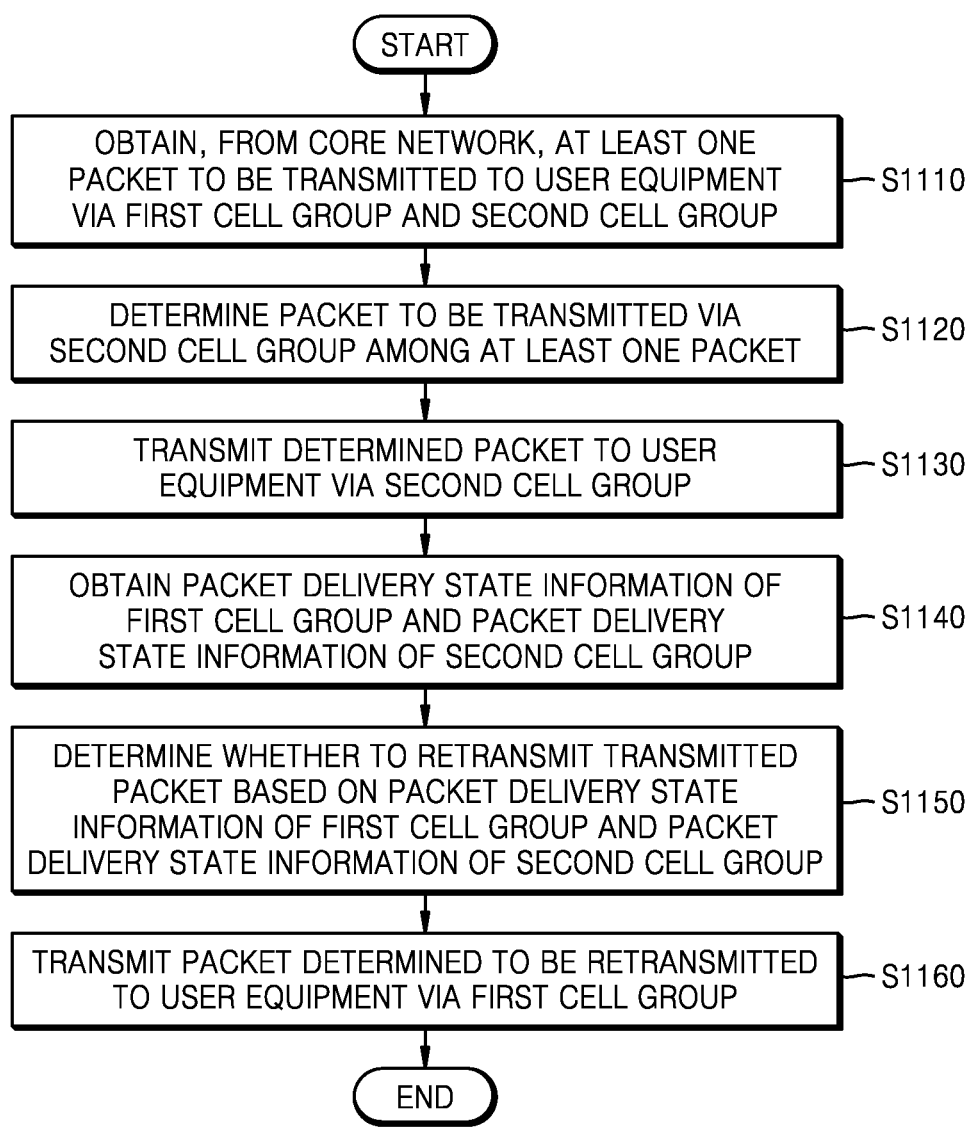
FIG. 11 is a flowchart of a data transmission method according to an embodiment of the disclosure.

FIG. 11 is a flowchart of a data transmission method according to an embodiment of the disclosure.

Hereinbelow, in a description of FIG. 11, a detailed description redundant to the description of FIG. 6 will be omitted.

Each operation in FIG. 11 may be performed by a cell group including a split bearer between a first cell group and a second cell group which are dual-connected to a user equipment, and for convenience of a description, the split bearer is assumed to be included in the first cell group.

In operation S1110, the first cell group may obtain at least one packet to be transmitted to the user equipment from a core network. The core network may be any one of EPC or 5GC, and may be determined according to a network deployment scenario.

In operation S1120, the first cell group may determine a packet to be transmitted to the user equipment via the second cell group among packets obtained from the core network. Similarly, the first cell group may determine a packet to be transmitted to the user equipment via the first cell group among the packets obtained from the core network (not shown).

In operation S1130, the first cell group (e.g., a PDCP) may deliver the determined packet to be transmitted to the user equipment via the second cell group to the second cell group (e.g., RLC). Likewise, the first cell group may deliver the determined packet to be transmitted to the user equipment via the first cell group to a low layer (e.g., the RLC) of the first cell group (not shown).

The packet delivered to the second cell group may be delivered to the user equipment via RLC, MAC, and PHY layers of the second cell group. The user equipment having received a packet may feed an ACK (e.g., HARQ) regarding packet reception back to the first cell group and the second cell group, and the second cell group may update a packet delivery state (e.g., a DDDS) based on a feedback signal received from the user equipment. Likewise, the first cell group may update the packet delivery state (e.g., the DDDS) based on the feedback signal received from the user equipment.

In operation S1140, the first cell group may obtain a packet delivery state of the first cell group and a packet delivery state of the second cell group.

For example, the NR PDCP of the first cell group may periodically receive the DDDS of the first cell group from the RLC of the first cell group, and periodically receive the DDDS of the second cell group from the RLC of the second cell group.

In operation S1150, the first cell group may determine whether to perform packet retransmission based on the packet delivery state of the first cell group and the packet delivery state of the second cell group.

For example, when expiration of the reordering timer is expected by a certain packet transmitted via the second cell group, the first cell group may determine to retransmit the packet. According to an embodiment of the disclosure, whether to retransmit the packet may be determined based on a duration of the reordering timer, an expiration set time of the reordering timer, and a certain threshold value.

When packet retransmission is determined in operation S1150, the first cell group may transmit a packet, which is determined to be retransmitted, to the user equipment via the first cell group in operation S1160.

More specifically, when packet retransmission is determined, the PDCP of the first cell group may duplicate the packet to transmit the determined packet via the first cell group, and may transmit the packet through a user-plane protocol of the first cell group. According to an embodiment of the disclosure, the packet determined to be retransmitted may be duplicated and transmitted fast preferentially over other packets.

Figure 12:
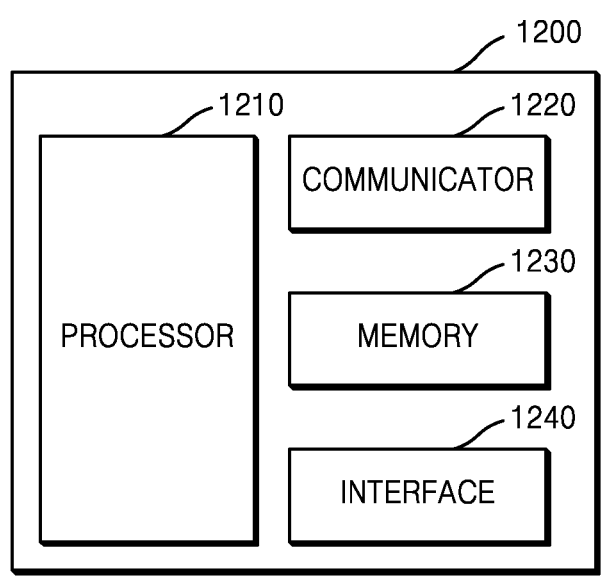
FIG. 12 is a block diagram of a data transmission apparatus according to an embodiment of the disclosure.

FIG. 12 is a block diagram of a data transmission apparatus 1200, according to an embodiment of the disclosure.

The data transmission apparatus 1200 according to the disclosure may include, as a cell group including a split bearer, a processor 1210, a communicator 1220, a memory 1230, and an interface 1240, as shown in FIG. 12.

However, components of the data transmission apparatus 1200 are not limited to the above-described example. For example, the data transmission apparatus 1200 may include components that are more than or less than the above-described components. Moreover, the processor 1210, the communicator 1220, the memory 1230, and the interface 1240 may be implemented in a single chip form. In the data transmission apparatus 1200 in FIG. 12, components related to the embodiment are illustrated. Thus, it would be understood by those of ordinary skill in the art that general-purpose components other than the components illustrated in FIG. 12 may also be included in the data transmission apparatus 1200.

The processor 1210 may control a series of processes for transmitting data (e.g., a packet), described in FIGS. 1 through 11.

More specifically, the processor 1210 may control components of the data transmission apparatus 1200 to predict expiration of the reordering timer of the user equipment and to duplicate and retransmit a reception-delayed packet triggering the reordering timer. The processor 1210 may be provided in plural and may perform the above-described retransmission operation by executing a plurality of instructions (or programs) stored in the memory 1230.

According to an embodiment of the disclosure, the processor 1210 may control a series of processes in which a cell group or a split bearer may operate, shown in FIGS. 1 through 11. For example, the cell group or the split bearer may be implemented as the plurality of instructions (or programs). The processor 1210 may perform operations of the cell group or the split bearer by executing the plurality of instructions (or programs).

The processor 1210 may control overall functions for controlling the data transmission apparatus 1200. For example, the processor 1210 may control the data transmission apparatus 1200 in general by executing programs stored in the memory 1230 included in the data transmission apparatus 1200. The processor 1210 may be implemented with, but not limited to, a central processing unit (CPU), a graphical processing unit (GPU), an application processor (AP) included in the data transmission apparatus 1200, or the like.

The communicator 1220 may perform connection to another apparatus by using a wired/wireless communication module, and transmit and receive data.

The communicator 1220 may transmit and receive a signal to and from an external device (e.g., a user equipment), a network (e.g., a core network), or other data transmission apparatuses (e.g., cell groups). The signal transmitted and received by the communicator 1220 may include control information and data. The communicator 1220 may include an RF transmitter that up-converts and amplifies a frequency of a transmission signal and an RF receiver that low-noise-amplifies a received signal and down-converts a frequency. However, this is merely an example of the communicator 1220, components of which are not limited to the RF transmitter and the RF receiver.

The communicator 1220 may receive a signal through a radio channel and output the received signal to the processor 1210, and transmit a signal output from the processor 1210 through the radio channel.

According to an embodiment of the disclosure, the communicator 1220 may transmit and receive data or a signal to and from an external device, a network, or other data transmission apparatuses, under control of the processor 1210.

The memory 1230 may be hardware storing various types of data processed in the data transmission apparatus 1200, and for example, the memory 1230 may store data received, processed or to be processed by the communicator 1220.

According to an embodiment of the disclosure, a plurality of instructions (or programs) and data required for an operation of the data transmission apparatus 1200 may also be stored in the memory 1230. The memory 1230 may also store control information or data included in a signal transmitted and received by the data transmission apparatus 1200. The memory 1230 may include a storage medium such as read-only memory (ROM), random access memory (RAM), hard-disk, compact disc (CD)-ROM, digital versatile disk (DVD), etc., or a combination thereof. The memory 1230 may be provided in plural. The interface 1240 may transmit and receive data and commands for mutual operations between internal components of the data transmission apparatus 1200.

The methods according to the embodiments of the disclosure described in the claims or specification of the disclosure may be implemented as hardware, software, or a combination thereof.

When the methods are implemented as software, a computer-readable storage medium or a computer program product having stored therein one or more programs (software modules) may be provided. The one or more programs stored in the computer-readable storage medium or computer program product may be configured for execution by one or more processors in an electronic device. The one or more programs include instructions that cause the electronic device to execute the methods according to the embodiments of the disclosure described in the claims or the specification of the disclosure.

These programs (software modules and software) may be stored in RAMs, non-volatile memories including flash memories, ROMs, electrically erasable programmable ROMs (EEPROMs), magnetic disc storage devices, CD-ROMs, DVDs, other types of optical storage devices, or magnetic cassettes. The programs may be stored in a memory configured by a combination of some or all of such storage devices. Also, each of the memories may be provided in plurality.

The programs may be stored to an attachable storage device of the electronic device accessible via the communication network such as Internet, Intranet, a local area network (LAN), a wireless LAN (WLAN), or storage area network (SAN), or a communication network by combining the networks. The storage device may access a device performing the embodiment of the disclosure through an external port. Furthermore, a separate storage device in a communication network may access a device performing the embodiment of the disclosure.

In the disclosure, the term "computer program product" or "computer-readable medium" may be used to overall indicate a memory, a hard disk installed in a hard disk drive, a signal, etc. These "computer program products" or "computer-readable media" may be means for providing software including an instruction for setting a length of a timer for receiving a lost data packet to a computer system based on a network metric corresponding to a determined event according to the disclosure.

The machine-readable storage medium may be provided in the form of a non-transitory storage medium. Wherein, the term 'non-transitory storage medium' simply means that the storage medium is a tangible device, and does not include a signal (e.g., an electromagnetic wave), but this term does not differentiate between where data is semi-permanently stored in the storage medium and where the data is temporarily stored in the storage medium. For example, the 'non-transitory storage medium' may include a buffer in which data is temporarily stored.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. When distributed online, at least a part of the computer program product (e.g., a downloadable app) may be temporarily generated or at least temporarily stored in the machine-readable storage medium, such as memory of the manufacturer's server, a server of the application store, or a relay server.

In the detailed embodiments of the disclosure, components included in the disclosure have been expressed as singular or plural according to the provided detailed embodiment of the disclosure. However, singular or plural expressions have been selected properly for a condition provided for convenience of a description, and the disclosure is not limited to singular or plural components and components expressed as plural may be configured as a single component or a component expressed as singular may also be configured as plural components.

While embodiments of the disclosure have been described, various changes may be made without departing the scope of the disclosure. Therefore, the scope of the disclosure should be defined by the appended claims and equivalents thereof, rather than by the described embodiments of the disclosure.

What is claimed is:

1. A data transmission method performed by a node in dual connectivity (DC), the method comprising:
   obtaining, from a core network (CN), at least one packet for transmitting to a user equipment (UE) via a first node or a second node;
   determining a first packet to be transmitted via the first node, among the at least one packet;
   obtaining first packet delivery state information corresponding to the first node generated at a radio link control (RLC) layer of the first node, wherein the first packet delivery state information indicates the first packet is not received at the UE;
   obtaining second packet delivery state information corresponding to the second node generated at an RLC layer of the second node;
   predicting expiration of a timer of the UE related to packet delay based on the first packet delivery state information and the second packet delivery state information; and
   in response to the expiration of the timer being predicted, determining whether to retransmit the first packet to the UE via the second node,
   wherein the node is the first node or the second node.

2. The data transmission method of claim 1, wherein the timer of the UE related to the packet delay is a reordering timer of the UE.

3. The data transmission method of claim 2, wherein the predicting of the expiration of the reordering timer of the UE comprises comparing $T_{reordertimer} - (T_{real} - T_{reorder})$ with a threshold value, and
   wherein $T_{reordertimer}$ indicates a time for which the UE waits for the transmitted packet, $T_{real}$ indicates a current time, and $T_{reorder}$ indicates a time from which the reordering timer starts in the UE.

4. The data transmission method of claim 1, wherein the predicting expiration of the timer of the UE related to the packet delay comprises inputting current first packet delivery state information and current second packet delivery state information to an artificial intelligence (AI) model trained based on the first packet delivery state information and the second packet delivery state information.

5. The data transmission method of claim 1, wherein the first packet delivery state information and the second packet delivery state information are determined based on feedback information received from the UE.

6. The data transmission method of claim 1, wherein the first packet delivery state information comprises a downlink data delivery status (DDDS) of an RLC layer of the first node, and
   the second packet delivery state information comprises a DDDS of an RLC layer of the second node.

7. The data transmission method of claim 1, wherein the first packet is retransmitted via the second node, preferentially over other packets.

8. A data transmission node in dual connectivity (DC) comprising:
   a transceiver;
   a processor; and
   memory storing instructions being executable by the processor, for causing the data transmission node to be configured to:
   obtain, from a core network (CN), at least one packet for transmitting to a user equipment (UE) via a first node or a second node,
   determine a first packet to be transmitted via the first node, among the at least one packet,
   obtain first packet delivery state information corresponding to the first node generated at a radio link control (RLC) layer of the first node, wherein the first packet delivery state information indicates the first packet is not received at the UE,
   obtain second packet delivery state information corresponding to the second node generated at an RLC layer of the second node,
   predict expiration of a timer of the UE related to packet delay based on the first packet delivery state information and the second packet delivery state information, and
   in response to the expiration of the timer of the UE being predicted, determine whether to retransmit the first packet to the UE via the second node,
   wherein the node is the first node or the second node.

9. The data transmission node of claim 8, wherein the timer of the UE related to the packet delay is a reordering timer of the UE.

10. The data transmission node of claim 9, wherein the data transmission node is further configured to predict the expiration of the reordering timer of the UE by comparing $T_{reordertimer} - (T_{real} - T_{reorder})$ with a threshold value, and
    wherein $T_{reordertimer}$ indicates a time for which the UE waits for the transmitted packet, $T_{real}$ indicates a current time, and $T_{reorder}$ indicates a time from which the reordering timer starts in the UE.

11. The data transmission node of claim 8, wherein the data transmission node is further configured to predict expiration of the timer of the UE related to the packet delay, based on an output result of inputting current first packet delivery state information and current second packet delivery state information to an artificial intelligence (AI) model trained based on the first packet delivery state information and the second packet delivery state information.

12. The data transmission node of claim 8, wherein the first packet delivery state information and the second packet delivery state information are determined based on feedback information received from the UE.

13. The data transmission node of claim 8, wherein the first packet delivery state information comprises a downlink data delivery status (DDDS) of an RLC layer of the first node, and the second packet delivery state information comprises a DDDS of an RLC layer of the second node.

14. The data transmission node of claim 8, wherein the first packet is retransmitted via the second node, preferentially over other packets.

15. A non-transitory computer-readable recording medium having recorded thereon a computer program which, when executed by at least one processor of a data transmission node in dual connectivity (DC), cause the data transmission node to perform operations comprising:

obtaining, from a core network (CN), at least one packet for transmitting to a user equipment (UE) via a first node or a second node;

determining a first packet to be transmitted via the first node, among the at least one packet;

obtaining first packet delivery state information corresponding to the first node generated at a radio link control (RLC) layer of the first node, wherein the first packet delivery state information indicates the first packet is not received at the UE;

obtaining second packet delivery state information corresponding to the second node generated at an RLC layer of the second node;

predicting expiration of a timer of the UE related to packet delay based on the first packet delivery state information and the second packet delivery state information; and in response to the expiration of the timer being predicted, determining whether to retransmit the first packet to the UE via the second node, wherein the node is the first node or the second node.

16. The medium of claim 15, wherein the timer of the UE related to the packet delay is a reordering timer of the UE.

17. The medium of claim 16, wherein the predicting of the expiration of the reordering timer of the UE comprises comparing $T_{reordertimer}-(T_{real}-T_{reorder})$ with a threshold value, and wherein $T_{reordertimer}$ indicates a time for which the UE waits for the transmitted packet, $T_{real}$ indicates a current time, and $T_{reorder}$ indicates a time from which the reordering timer starts in the UE.

18. The medium of claim 15, wherein the predicting expiration of the timer of the UE related to the packet delay comprises inputting current first packet delivery state information and current second packet delivery state information to an artificial intelligence (AI) model trained based on the first packet delivery state information and the second packet delivery state information.

19. The medium of claim 15, wherein the first packet delivery state information and the second packet delivery state information are determined based on feedback information received from the UE.

20. The medium of claim 15, wherein the first packet delivery state information comprises a downlink data delivery status (DDDS) of an RLC layer of the first node, and the second packet delivery state information comprises a DDDS of an RLC layer of the second node.

* * * * *